United States Patent

Kubota et al.

[11] Patent Number: 5,953,466
[45] Date of Patent: Sep. 14, 1999

[54] OPTICAL MODULATOR

[75] Inventors: Yoshinobu Kubota; Yasuhiro Omori, both of Kawasaki; Toshihiro Otani; Tomoyuki Itoh, both of Sapporo, all of Japan

[73] Assignee: Fujitsu Limited, Kawasaki, Japan

[21] Appl. No.: 08/901,336

[22] Filed: Jul. 28, 1997

[30] Foreign Application Priority Data

Feb. 17, 1997 [JP] Japan .................................. 9-032489

[51] Int. Cl.⁶ ............................................. G02B 6/10
[52] U.S. Cl. ............................ 385/2; 385/14; 385/8; 385/49; 385/33
[58] Field of Search ........................... 385/14, 2, 3, 8, 385/9, 10, 33, 49

[56] References Cited

U.S. PATENT DOCUMENTS

| | | | |
|---|---|---|---|
| 5,199,086 | 3/1993 | Johnson et al. | 385/2 |
| 5,267,336 | 11/1993 | Sriam et al. | 385/2 |
| 5,276,744 | 1/1994 | Shaw | 385/2 |
| 5,400,417 | 3/1995 | Allie et al. | 385/2 |

FOREIGN PATENT DOCUMENTS

| | | |
|---|---|---|
| 3-145623 | 6/1991 | Japan . |
| 3-251815 | 11/1991 | Japan . |
| 4-24610 | 1/1992 | Japan . |
| 5-53086 | 3/1993 | Japan . |

*Primary Examiner*—Hung N. Ngo
*Attorney, Agent, or Firm*—Staas & Halsey

[57] ABSTRACT

An optical modulator for modulating light emitted from a signal light source has a substrate having electrooptic effect, an optical waveguide of a Mach-Zehnder type formed on the substrate, an electrode formed on the substrate to control light propagated in the optical waveguide, a light guiding unit for guiding light radiated or leaking from the optical waveguide, an interference light generating means for making light emitted from the light guiding unit and signal light leaking from the optical waveguide interfere with each other to generate interference light, and for emitting the interference light from an end surface of the substrate, a photo-detector for monitoring the interference light obtained by the interference light generating means, and a signal controlling circuit for controlling an operating point of the optical modulator according to a change of the interference light monitored by the photo-detector, thereby stably controlling the operating point of the optical modulator while facilitating a design of the mechanism.

124 Claims, 24 Drawing Sheets

MASK PATTERNING OF THE LIGHT GUIDING REGION 21

1a: SUBSTRATE

PROTON EXCHANGING PROCESS

4: OPTICAL WAVEGUIDE

ANNEALING PROCESS IN $O_2$

F I G. 18
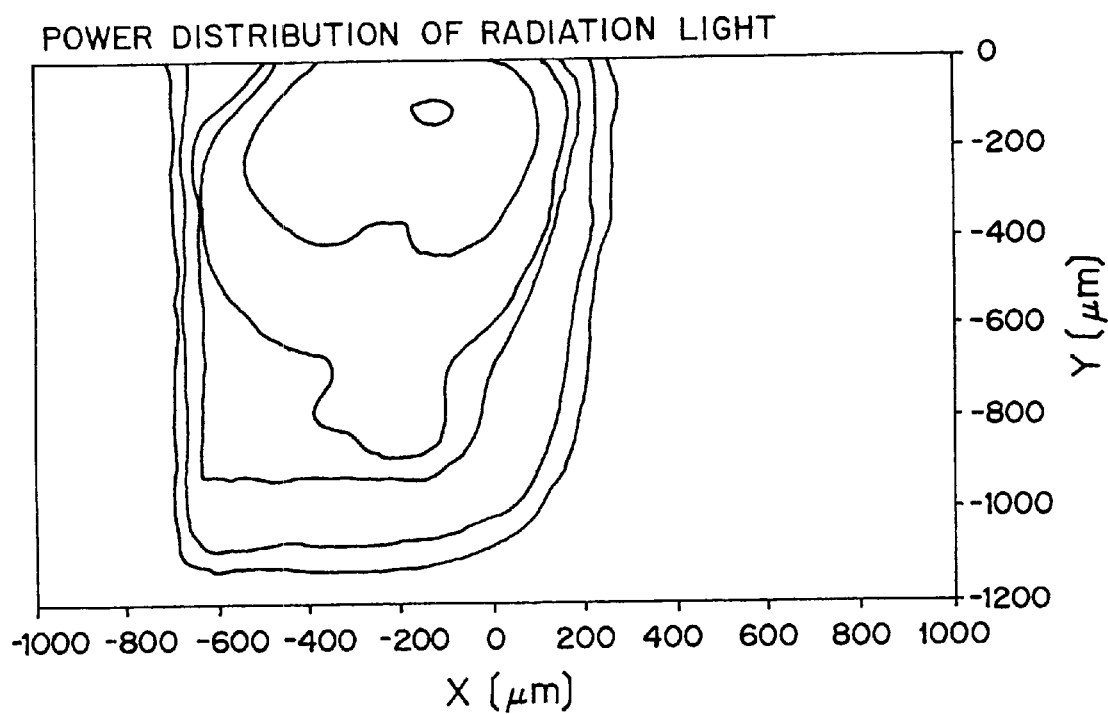

F I G. 23
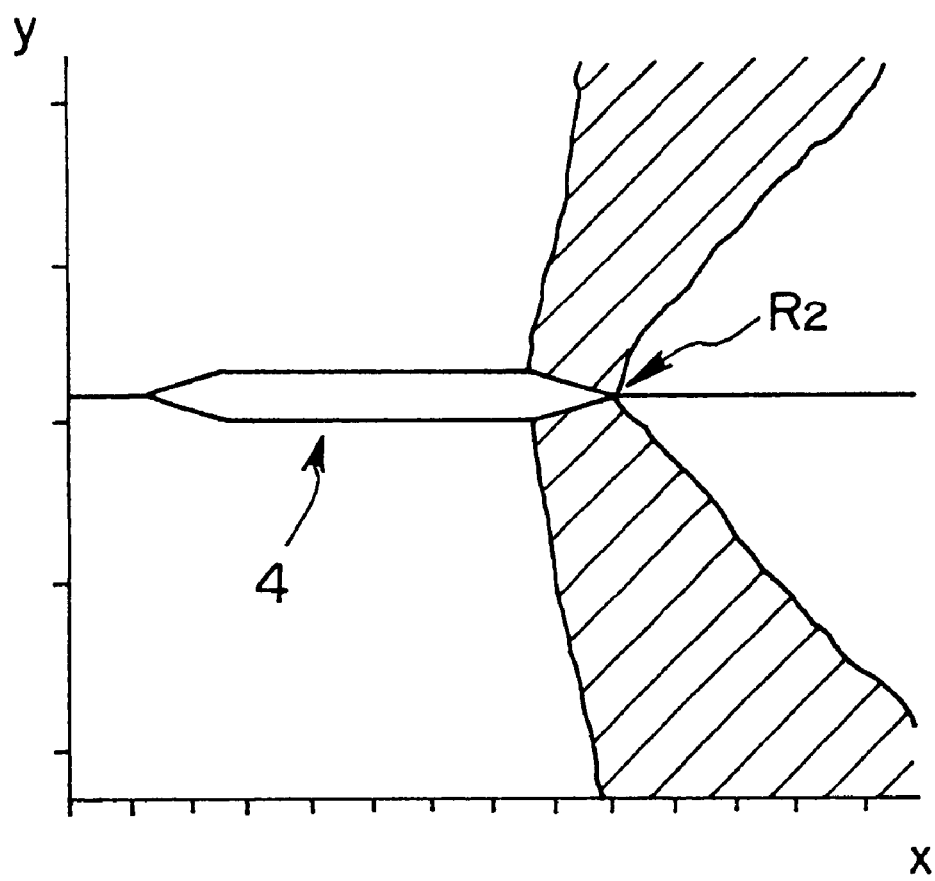

F I G. 24
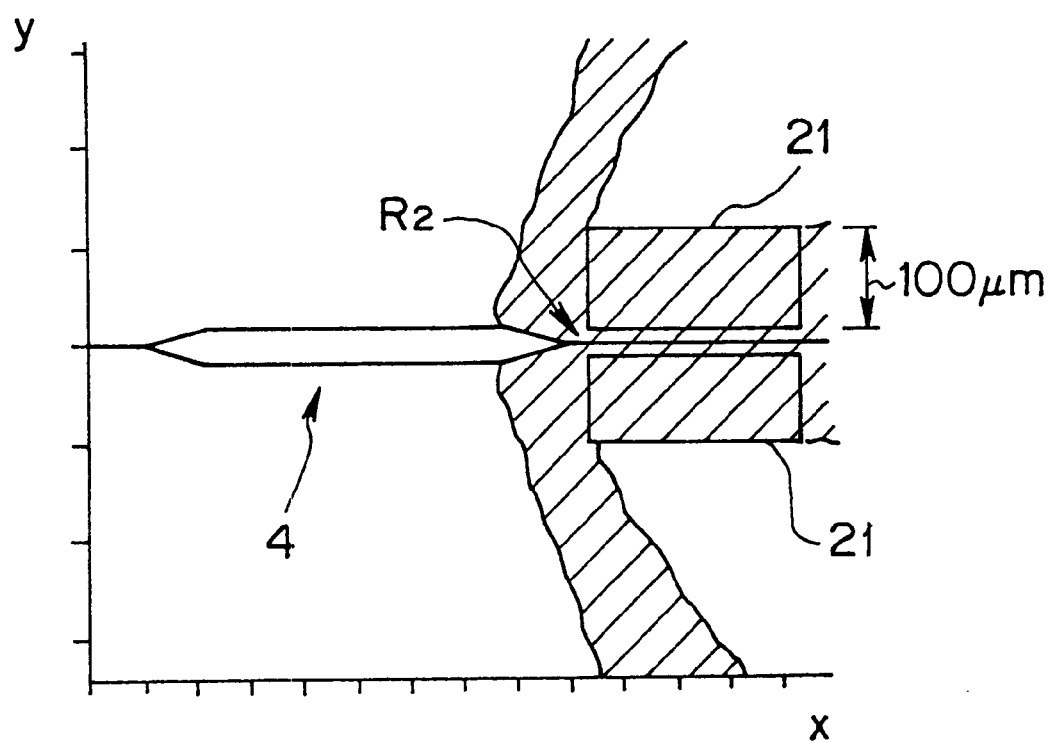

OPTICAL MODULATOR

BACKGROUND OF THE INVENTION (1) Field of the Invention

The present invention relates to an optical modulator suitable for use as an external optical modulator for modulating light emitted from a signal light source, in a transmitting unit of, for example, an ultra high-speed optical communication system.

(2) Description of Related Art

There has been used, in a transmitting unit of an optical communication system, an optical modulator in a direct modulation system which modulates an electric current flowing in a semiconductor laser with a data signal, as an optical modulator which modulates light emitted from, for example, a semiconductor laser as a signal source.

However, a recent demand for high-speed optical communication system is accompanied with necessity of high-speed optical modulator. If light is modulated at a high speed using such optical modulator in a direct modulation system, an effect of a wavelength fluctuation (chirping) of emitted signal light becomes greater, which leads to wavelength dispersion in an optical fiber. As a result, a long-distance transmission becomes difficult.

It is therefore necessary to use an external modulator which does not generate chirping in principle when light is modulated at a high speed. As an example of the above external modulator, there is an optical modulator of a Mach-Zehnder type shown in FIG. 28. Incidentally, FIG. 29 is a perspective view of the optical modulator 100 of a Mach-Zehnder type shown in FIG. 28, looking from an outputting side thereof.

As shown in FIG. 28, the optical modulator 100 of a Mach-Zehnder type has an optical waveguide device 101 of a Mach-Zehnder type, a photo-detector 107 and a signal controlling circuit (ABC circuit; automatic bias control circuit) 108.

An optical waveguide 104 of a Mach-Zehnder type is formed on a substrate 101a, further a travelling-wave electrode 102 and a grounding electrode 103 are formed on the optical waveguide 104, whereby the optical waveguide device 101 of a Mach-Zehnder type is formed.

The optical waveguide 104 of a Mach-Zehnder type has an input waveguide 104a, an output waveguide 104b, and intermediate waveguides 104c and 104d. The intermediate waveguides 104c and 104d are disposed in parallel, and connected to the input waveguide 104a and the output waveguide 104b at a Y-shaped splitting portion $Q_1$ and a Y-shaped recombining portion $Q_2$.

The travelling-wave electrode 102 and the grounding electrode 103 are used to control light propagated in the optical waveguide 104, which are respectively formed on the intermediate waveguides 104c and 104d of the optical waveguide 104, as shown in FIG. 28.

Into the input waveguide 104a of the optical waveguide 104, direct-current light emitted from a semiconductor laser 111 is inputted through an optical fiber 105a. From the output waveguide 104b of the optical waveguide 104, modulated signal light is outputted to a photo-detector 112 through an optical fiber 105b.

The photo-detector 112 receives the signal light outputted through the optical fiber 105b to convert it into an electric signal.

An optical fiber 106 is directly attached, in addition to the above-mentioned optical fiber 105b, onto an end surface on the outputting side of the substrate 101a, through which radiation light (monitor light) generated at the Y-shaped recombining portion $Q_2$ of the optical waveguide 104 is inputted to the photo-detector 107.

The photo-detector 107 receives the radiation light inputted through the optical fiber 106 to convert the received radiation light into an electric signal, and outputs the electric signal to the signal controlling circuit 108, thereby monitoring the radiation light.

The photo-detector 107 is connected to the signal controlling circuit 108, which varies direct-current bias of an inputted electric signal to be applied to the travelling-wave electrode 102 according to a result of the monitoring by the photo-detector 107 (that is, according to a change of a light output electric signal from the photo-detector 107).

In general, in the optical modulator 100 of a Mach-Zehnder type, an operating point of the optical modulator 100 of a Mach-Zehnder type is shifted with time elapsed due to temperature drift, DC drift, stress and the like.

Now, shift of the operating point of the optical modulator 100 of a Mach-Zehnder type will be explained with reference to FIG. 30.

FIG. 30 is a diagram showing an input-output characteristic of the optical modulator 100 of a Mach-Zehnder type. In FIG. 30, ④ indicates the characteristic before the operating point is shifted, and ③ indicates the characteristic in the case where the operating point has been shifted.

As shown in FIG. 30, the input-output characteristic of the optical modulator 100 of a Mach-Zehnder type has periodicity to a driving voltage.

Use of driving voltages $V_0$ and $V_1$ at which an upper peak value and a lower peak value of an output light power are obtained according to a logical multiplication of an input signal enables efficient binary modulation.

However, if the driving voltages $V_0$ and $V_1$ are constant even in the case where the operating point is shifted, an extinction ratio of a signal light outputted from the optical modulator 100 of a Mach-Zehnder type is degraded because of the above-mentioned periodicity as shown in FIG. 30.

When the operating point is shifted, it is therefore necessary to control the operating point assuming the driving voltages $V_0$ and $V_1$ as $(V_0+dV)$ and $(V_1+dV)$, respectively, if a quantity of the shift is dV.

In the optical modulator 100 of a Mach-Zehnder type shown in FIG. 28, the photo-detector 107 monitors radiation light generated at the Y-shaped recombining portion $Q_2$ of the optical waveguide 104, the signal controlling circuit 108 varies direct-current bias of an input electric signal to be applied to the travelling-wave electrode 102, whereby the operating point of the optical modulator 100 of a Mach-Zehnder type is controlled.

Incidentally, reference numeral 109 denotes an input signal source, and reference numeral 110 denotes a termination resistor.

In the optical modulator 100 of a Mach-Zehnder type with the above structure shown in FIG. 28, direct-current light (incident light) from the semiconductor laser 111 is inputted to the input waveguide 104a of the optical waveguide 104 through the optical fiber 105a, split into two at the Y-shaped splitting portion $Q_1$, then propagated in the intermediate waveguides 104c and 104d.

If a high-frequency modulating signal voltage is applied to the travelling-wave electrode 102 at this time, a phase difference is generated between the split incident lights by the electrooptic effect in the intermediate waveguides 104c and 104d, and the incident lights whose phases are different are again combined at the Y-shaped recombining portion $Q_2$.

By setting the driving voltages at this time such that the phase difference between the incident lights in the intermediate waveguides 104c and 104d is 0 and π, an ON/OFF optical pulse signal can be obtained as signal light to be outputted, and modulated signal light is outputted from the output waveguide 104b of the optical waveguide 104.

The signal light outputted from the output waveguide 104b is received by the photo-detector 112 through the optical fiber 105b to be converted into an electric signal.

On the other hand, the radiation light generated at the Y-shaped recombining portion $Q_2$ of the optical waveguide 104 is received by the photo-detector 107 through the optical fiber 106, converted into an electric signal, then outputted to the signal controlling circuit 108.

The signal controlling circuit 108 varies direct-current bias of the input electric signal to be applied to the travelling-wave electrode 102 according to a change of the light output electric signal from the photo-detector 107, thereby controlling the operating point of the optical modulator 100 of a Mach-Zehnder type.

As above, the optical modulator 100 of a Mach-Zehnder type shown in FIG. 28 can stabilize the operating point thereof so as to prevent degradation of signal light as shown in FIG. 30, and thus enables stable optical modulation.

The optical modulator 100 of a Mach-Zehnder type shown in FIG. 28 has, however, disadvantages that it is necessary to align the optical fiber 106 for monitoring since the optical fiber 106 is used when the radiation light generated at the Y-shaped recombining portion $Q_2$ of the light waveguide 104 is monitored, and thus there is a difficulty in designing the mechanism.

Namely, the optical fiber 105b to which modulated signal light is inputted and the optical fiber 106 to which radiation light generated at the Y-shaped recombining portion $Q_2$ of the light waveguide 104 is inputted are spaced only about 80 μm apart so that fabrication of the optical modulator 100 of a Mach-Zehnder type is difficult.

For this, there has been also proposed an optical modulator 100A of a Mach-Zehnder type without the optical fiber 106 for monitoring, as shown in FIG. 31.

FIG. 32 is a side view of an outputting side of an optical waveguide device 100A of a Mach-Zehnder type shown in FIG. 31.

Namely, the optical modulator 100A of a Mach-Zehnder type shown in FIG. 31 is directly arranged a photo-detector 107 in the rear stage of an end surface on an outputting side of a substrate 101a to directly receive radiation light emitted from the end surface on the outputting side of the substrate 101a by the photo-detector 107.

In FIG. 31, like reference characters designate like or corresponding parts or functions of the optical modulator 100 of a Mach-Zehnder type in FIG. 28.

In FIG. 31, reference numeral 113 denotes an optical fiber to which direct-current light from a semiconductor laser (not shown in FIG. 31) is inputted, reference numeral 114 denotes a lens for condensing incident light from the optical fiber 113, reference numeral 115 denotes a lens for condensing signal light emitted from an output waveguide 104b of an optical waveguide 104, and reference numeral 116 denotes an optical fiber for outputting the signal light from the lens 115.

In the optical modulators 100 and 100A of a Mach-Zehnder type shown in FIGS. 28 and 31, respectively, radiation light generated at the Y-shaped recombining portion $Q_2$ of the optical waveguide 104 is uniformly emitted to the vicinity of the Y-shaped recombining portion $Q_2$ so that an intensity of the radiation light emitted from the end surface on the outputting side of the substrate 101a is small, and thus it is difficult to stably control the operating point of the optical modulator.

SUMMARY OF THE INVENTION

In the light of the above problems, an object of the present invention is to provide an optical modulator which can adjust a position on the end surface on the outputting side of the substrate to which monitor light is emitted and increase an intensity of the monitor light, thereby stably controlling the operating point of the optical modulator while facilitating a design of the mechanism.

The present invention therefore provides an optical modulator comprising a substrate having electrooptic effect, an optical waveguide of a Mach-Zehnder type formed on the substrate, an electrode formed on the substrate to control light propagated in the optical waveguide, a light guiding unit for guiding light radiated or leaking from the optical waveguide, and an interference light generating means for making light emitted from the light guiding unit and signal light leaking from the optical waveguide interfere with each other to generate interference light, and emitting the interference light from an end surface of the substrate.

The optical modulator according to this invention further comprises a photo-detector for monitoring the interference light obtained by the interference light generating means, and a signal controlling circuit for varying direct-current bias to be applied to the electrode according to a change of the interference light monitored by the photo-detector to control an operating point of the optical modulator.

A refractive index of the light guiding unit is such set as to differ from a refractive index of the substrate.

The light guiding unit may guide radiation light radiated from the optical waveguide, or guide radiation light radiated from the optical waveguide and the signal light leaking from the optical waveguide.

Further, the light guiding unit may be provided in the vicinity of an outputting-side optical waveguide forming the optical waveguide, or provided in the vicinity of an outputting-side optical waveguide with a recombining portion having the recombining portion forming the optical waveguide and the outputting-side optical waveguide forming the optical waveguide and connected to the recombining portion.

The light guiding unit may be formed as a light guiding unit fabricated by titanium diffusion, or as a light guiding unit fabricated by ion exchange.

The outputting-side optical waveguide may be a linear optical waveguide, or a curved optical waveguide having a curved portion.

The interference light may be such set as to have an inverted phase of the signal light.

The photo-detector may be disposed between the end surface of the substrate and a lens disposed in a front stage of an optical fiber for outputting, or disposed in a rear stage of the end surface of the substrate to which an optical fiber for outputting is coupled.

The photo-detector may be formed by placing a photo-detecting element on a plate member. At this time, the plate member may be a ceramic substrate, and the photo-detecting element may be a bear chip.

The substrate may be a lithium niobate substrate.

The optical modulator according to this invention guides light radiated or leaking from the optical waveguide by the light guiding unit, and makes light emitted from the light guiding unit and signal light leaking from the optical waveguide interfere with each other to generate interference light, thereby increasing an intensity of monitor light emitted from the end surface on the outputting side of the substrate while adjusting a position on the end surface on the outputting side of the substrate to which the interference light as the monitor light is emitted.

Whereby, it is possible to dispose the optical fiber to which modulated signal light is inputted and the photo-detector receiving interference light a desired distance apart. As a result, designing of a mechanism of the optical modulator becomes easy and an operating point control in the optical modulator becomes stable so that it is possible to prevent degradation of an extinction ratio of signal light due to a shift of the operating point of the optical modulator, and thus enable stable optical modulation.

If the light guiding unit is provided in the vicinity of the outputting-side optical waveguide with a recombining portion having the recombining portion forming the optical waveguide and the outputting-side optical waveguide forming the optical waveguide and connected to the recombining portion, it is possible to further increase condensation of light radiated or leaking from the optical waveguide.

If the ouptutting-side optical waveguide is formed by a curved optical waveguide having a curved portion, it is possible to prevent light emitted from the end surface on the outputting side of the substrate from coming again into the intermediate waveguides and the like of the optical waveguide.

BRIEF DESCRIPTION OF THE DRAWINGS

FIG. 18 is a diagram showing power distribution of the radiation light in the case where the light guiding region is not provided;

FIG. 23 is a diagram showing a result of a BPM simulation in the case where the light guiding region is not provided;

FIG. 24 is a diagram showing a result of the BPM simulation in the case where the light guiding region is provided;

DESCRIPTION OF THE PREFERRED EMBODIMENT

Hereinafter, an embodiment of this invention will be described with reference to the drawings.

(a) Description of an embodiment of the invention

Figure 1:
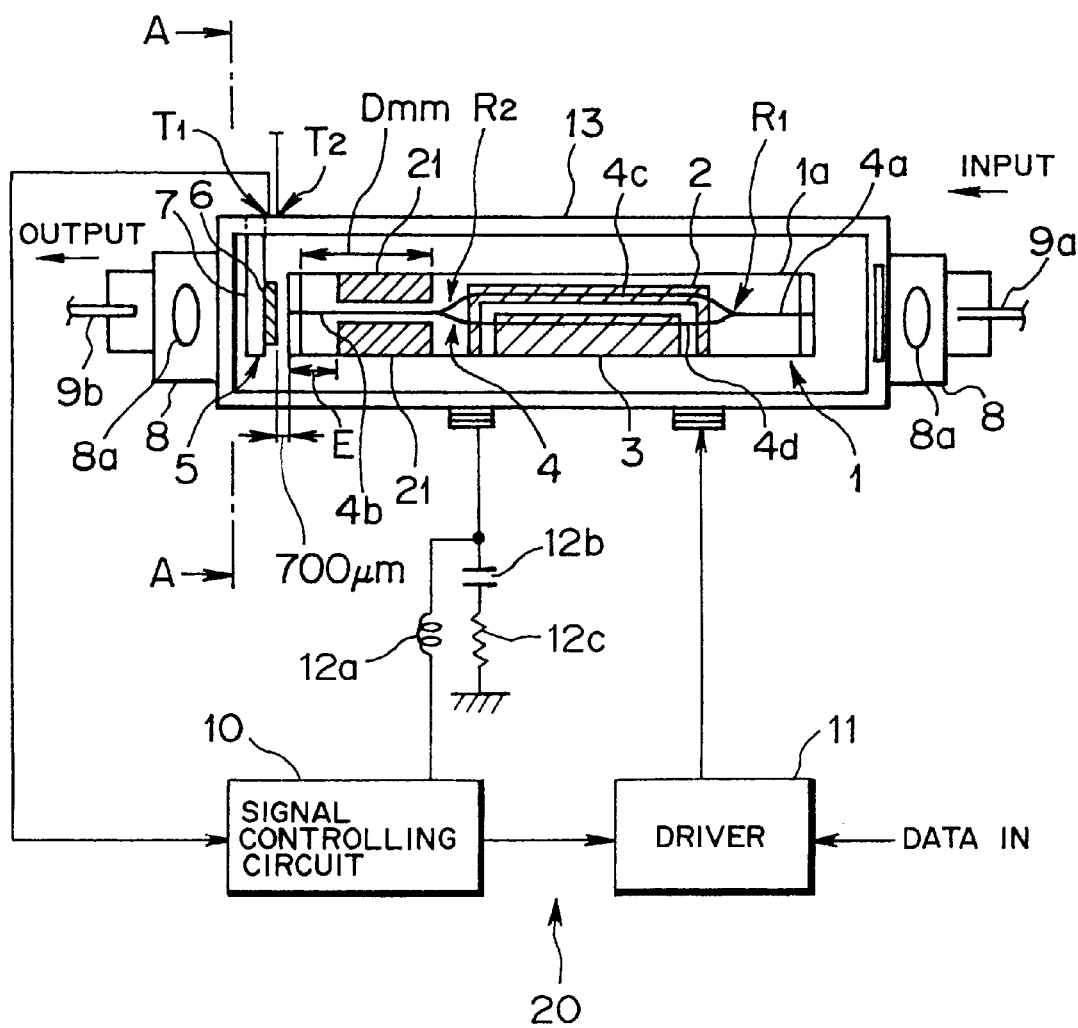
FIG. 1 is a schematic view of an optical modulator according to an embodiment of this invention.

FIG. 1 is a schematic view of an optical modulator according to an embodiment of this invention.

The optical modulator shown in FIG. 1 is an optical modulator of a Mach-Zehnder type in a system coupled via lenses, which is used as an external optical modulator for modulating light emitted from a signal light source such as a semiconductor laser or the like in a transmitting unit of, for example, an ultra high-speed optical communication system.

Figure 2:
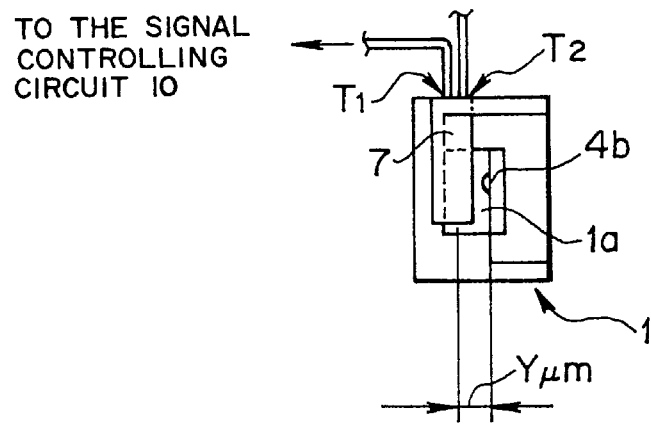
FIG. 2 is a sectional view of the optical modulator shown in FIG. 1 taken along line A—A.
Figure 3:
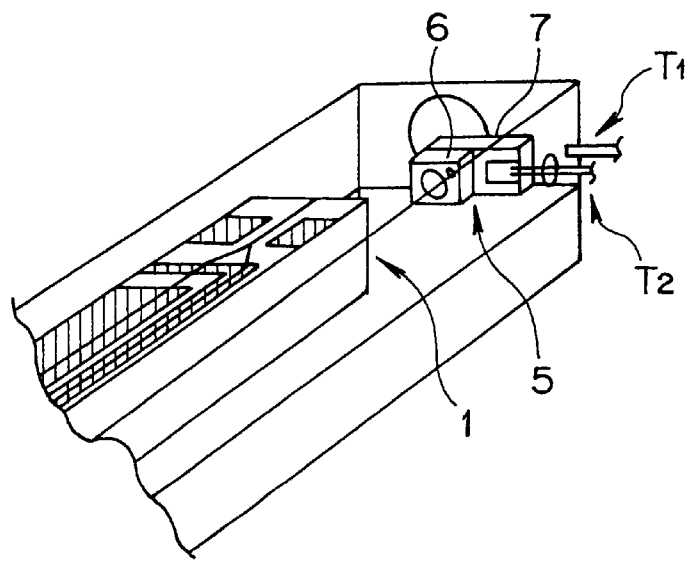
FIG. 3 is a perspective view of the optical modulator shown in FIG. 1 looking into an emitting side from an inputting side thereof.

FIG. 2 is a sectional view of the optical modulator 20 of a Mach-Zehnder type shown in FIG. 1 taken along line A—A. FIG. 3 is a perspective view of the optical modulator 20 of a Mach-Zehnder type shown in FIG. 1, looking into an emitting side from an inputting side thereof.

Figure 4:
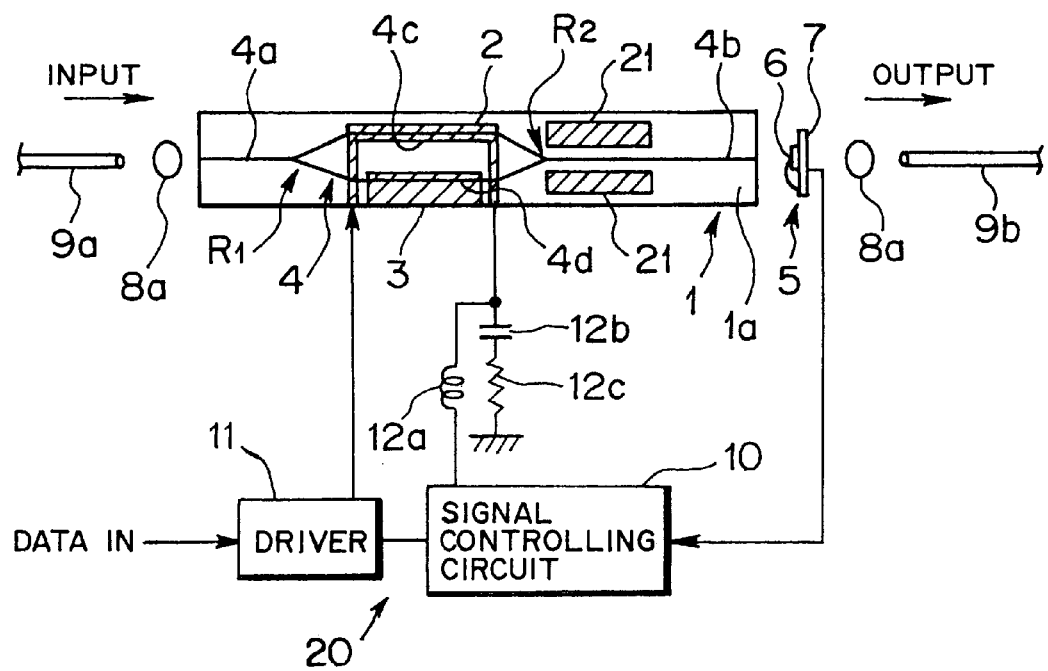
FIG. 4 is a schematic view of an essential structure of the optical modulator according to the embodiment of this invention.
Figure 5:
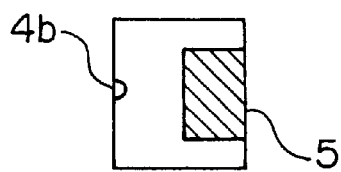
FIG. 5 is a side view of an outputting side of an optical waveguide device of a Mach-Zehnder type in the optical modulator shown in FIG. 4.

FIG. 4 is a schematic view of an essential part of the optical modulator 20 of a Mach-Zehnder type shown in FIG. 1. FIG. 5 is a side view of an outputting side of an optical waveguide device 1 of a Mach-Zehnder type shown in FIG. 4.

Figure 6A:
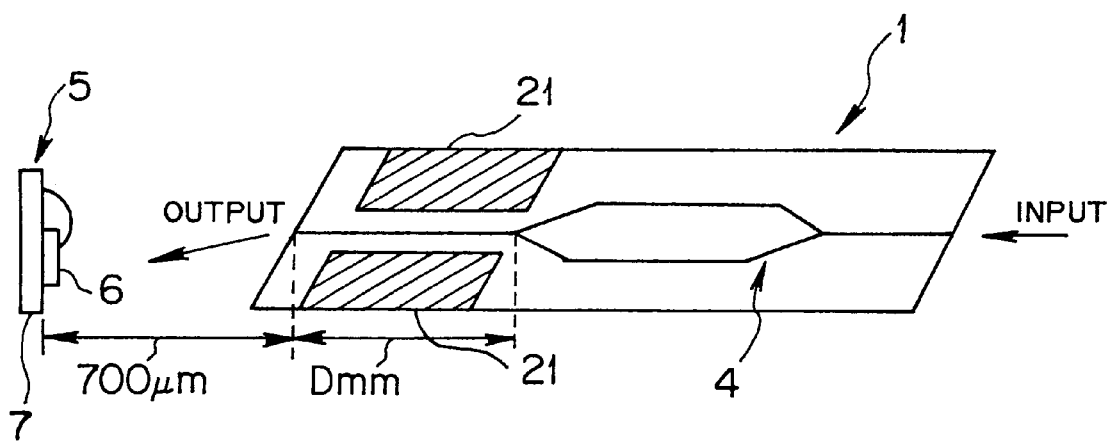
FIGS. 6(a) and 6(b) are diagrams for illustrating a position in which a photo-detector is disposed.
Figure 6B:
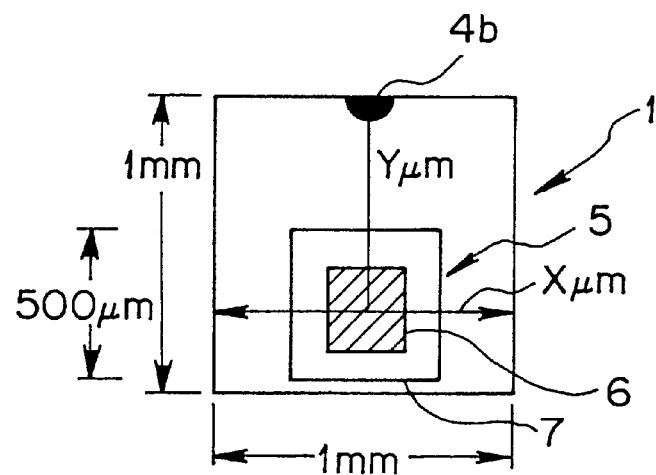
Figure 7:
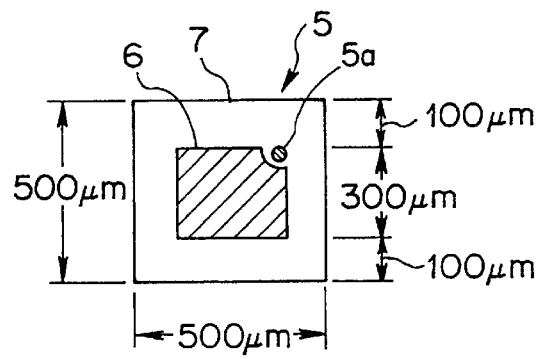
FIG. 7 is a diagram showing the photo-detector shown in FIG. 6(b)

FIGS. 6(a) and 6(b) are diagrams for illustrating a position in which a photo-detector 5 is disposed. FIG. 7 is the photo-detector 5 shown in FIG. 6(b).

As shown in FIG. 1, the optical modulator 20 of a Mach-Zehnder type has a package 13 in which the optical waveguide device (LN MOD) lithium niobate modutalor 1 of a Mach-Zehnder type and the photo-detector 5 are incorporated, a driver 11 as an input signal source, and a signal controlling circuit (ABC circuit; Automatic Bias Control Circuit) 10.

To an inputting side and an outputting side of the package 13, optical fibers 9a and 9b are connected via lens holders 8 each having a lens 8a used to increase the condensation, respectively.

Incidentally, the driver 11 receives pilot signals from the signal controlling circuit 10 to input data components in an inputted electric signal to the optical waveguide device 1 of a Mach-Zehnder type. Reference numeral 12a denotes an inductor, reference numeral 12b denotes a capacitor and reference numeral 12c denotes a 50Ω terminating resistor.

An optical waveguide 4 of a Mach-Zehnder type is formed on a substrate 1a, then a travelling-wave electrode 2 and a grounding electrode 3 are formed on the optical waveguide 4, whereby the optical waveguide device 1 of a Mach-Zehnder type is formed.

A light guiding region 21 is provided in the vicinity of the optical waveguide 4.

The substrate 1a is a lithium niobate (LiNbO$_3$) substrate (Z-cut substrate) having electrooptic effect.

The optical waveguide 4 of a Mach-Zehnder type has an input waveguide 4a, an output waveguide 4b and intermediate waveguides 4c and 4d (subwaveguides). The intermediate waveguides 4c and 4d are arranged in parallel and connected to the input waveguide 4a and the output waveguide 4b via a Y-shaped splitting portion $R_1$ and a Y-shaped recombining portion $R_2$.

Direct-current light from a semiconductor laser (not shown) is inputted to the input waveguide 4a of the optical waveguide 4 through the optical fiber 9a connected to the package 13, and modulated signal light is outputted from the output waveguide 4b of the optical waveguide 4 to the optical fiber 9b connected to the package 13. Incidentally, the optical fiber 9a is a constant polarization fiber, whereas the optical fiber 9b is a single-mode fiber.

A metal such as titanium (Ti) or the like in thickness of 1000 Å is evaporated on a surface of the lithium niobate (LiNbO$_3$) substrate 1a, a pattern is formed by photolithography and etching, and left for 8 hours in oxygen (in WetO$_2$) at a high temperature of, for example, 1000° C. to diffuse the metal such as Ti or the like into the substrate 1a in a titanium diffusing process, whereby the optical waveguide 4 is formed.

Namely, a metal such as Ti or the like is selectively diffused in only a part corresponding to the optical waveguide 1 of the substrate 1a so that the part has a larger refractive index than another part (the substrate 1a), whereby the optical waveguide 4 is formed.

On the optical waveguide 4, a buffer layer (not shown) formed by a thin film consisting of silicon dioxide (SiO$_2$) or the like is formed in order to decrease absorption of light by a metal electrode layer (the travelling-wave electrode 2 and the grounding electrode 3) on the optical waveguide 4.

To the buffer layer not shown, a coating (Si coat) is applied by depositing silicon (Si), although not shown, in order to improve stability of temperature of the optical waveguide device 1 of a Mach-Zehnder type.

The travelling-wave electrode 2 and the grounding electrode 3 are used to control light propagated in the optical waveguide 4, which are formed by evaporating a metal such as gold (Au) or the like on the intermediate waveguides 4c and 4d of the optical waveguide 4.

The travelling-wave electrode 2 and the grounding electrode 3 are connected to the input signal source 11. The travelling-wave electrode 2 and the grounding electrode 3 are applied thereto a voltage according to an input signal (modulating wave signal) from the input signal source 11 to vary a refractive index of the intermediate waveguides 4c and 4d as will be described later, thereby modulating direct-current light inputted from the semiconductor laser (not shown) through the optical fiber 9a.

The direct-current light from the semiconductor laser is modulated by the travelling-wave electrode 2 and the grounding electrode 3, then outputted as signal light (main signal light) or radiation light from the Y-shaped recombining portion $R_2$ of the optical waveguide 4.

Figure 12:
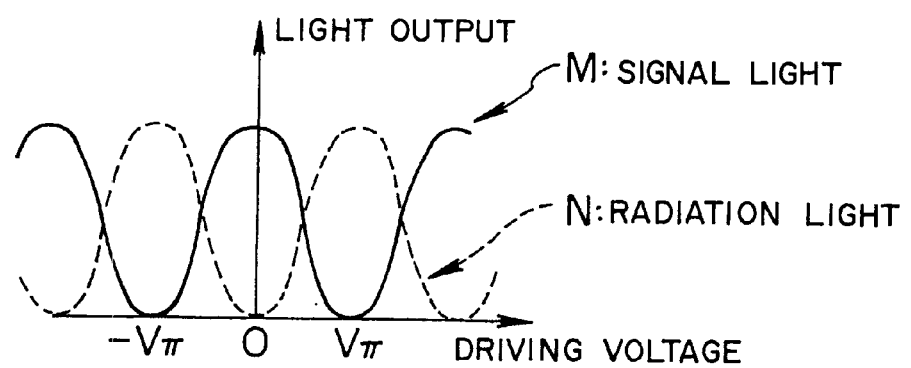
FIG. 12 is a diagram for illustrating signal light and radiation light.

The signal light and the radiation light have inverse phases, as shown in FIG. 12. The signal light and the radiation light have periodicity to a driving voltage. In FIG. 12, the signal light is indicated by reference character M, whereas the radiation light is indicated by reference character N.

Figure 13A:
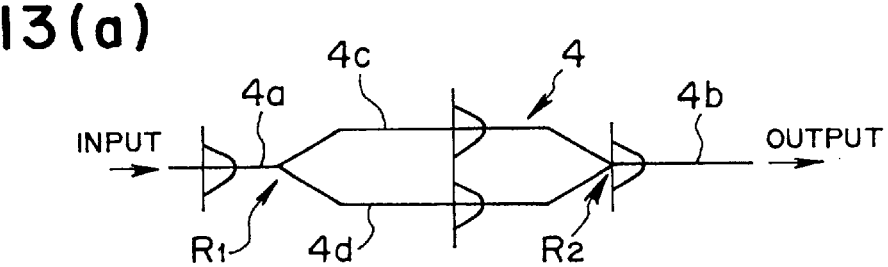
FIGS. 13(a) and 13(b) are diagrams for illustrating the signal light and the radiation light.
Figure 13B:
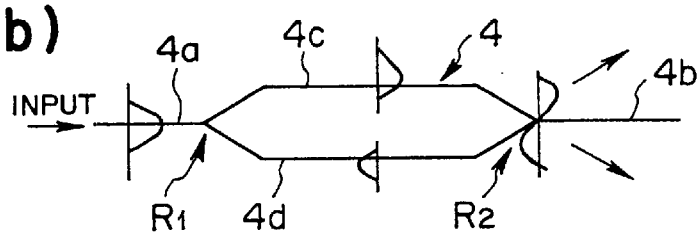

FIGS. 13(a) and 13(b) schematically show the optical waveguide 4 of the optical waveguide device 1 of a Mach-Zehnder type.

FIG. 13(a) shows a state of light propagation in the case where no voltage is applied, whereas FIG. 13(b) shows a state of light propagation in the case where a voltage is applied.

In each of FIGS. 13(a) and 13(b), a propagation mode is shown as a wave-like pattern in each of the waveguides (the input waveguide 4a, the output waveguide 4b and the intermediate waveguides 4c and 4d) of the optical waveguide 4.

In FIG. 13(a), the direct-current light from the semiconductor laser not shown is split by the Y-shaped splitting portion $R_1$ when inputted to the input waveguide 4a in a predetermined input mode, inputted to the intermediate waveguides 4c and 4d, propagated in the intermediate waveguides 4c and 4d in the same mode as the input mode, recombined at the Y-shaped recombining portion $R_2$, and outputted from the output waveguide 4b in the same mode.

In FIG. 13(b), the direct-current light from the semiconductor laser not shown is split by the Y-shaped splitting portion $R_1$ when inputted to the input waveguide 4a in a predetermined input mode, then inputted to the intermediate waveguides 4c and 4d. In this case, since a refractive index of the intermediate waveguides 4c and 4d is changed because of an applied voltage, a propagation velocity of the light is changed.

Therefore, a phase difference is generated in the lights propagated in the intermediate waveguides 4c and 4d. When the lights having different phases are recombined at the Y-shaped recombining portion $R_2$, a mode of light that should be inputted to the output waveguide 4b differs from the input mode.

For this, the light reaching the Y-shaped recombining portion $R_2$ cannot be outputted to the output waveguide 4b, and is thus radiated as radiation light to the inside of the substrate 1a.

However, if the optical waveguide 4 is fabricated under the above-mentioned conditions, the signal light slightly leaks from the Y-shaped recombining portion $R_2$ to the inside of the substrate 1a.

The radiation light radiated from the Y-shaped recombining portion $R_2$ and a part of the signal light leaking from the Y-shaped recombining portion $R_2$ come into the light guiding region 21 provided in the vicinity of the optical waveguide 4 (that is, in the vicinity of the both sides of the output waveguide 4b of the optical waveguide 4, in concrete).

The light guiding region 21 guides the radiation light radiated from the Y-shaped recombining portion $R_2$ and the signal light leaking from the Y-shaped recombining portion $R_2$ such that the radiation light and the signal light are not emitted from an end surface other than an end surface on the outputting side of the substrate 1a, which functions as a light guiding unit.

Namely, the light guiding region 21 guides light coming into the light guiding region 21 to prevent scattering of the coming light so as to increase an intensity of monitor light emitted from the end surface on the outputting side (designated portion) of the substrate 1a.

An intensity of the radiation light coming into the light guiding region 21 is larger than an intensity of the signal light coming into the light guiding region 21 so that the radiation light coming thereinto is mainly guided in the light guiding region 21.

The light guiding region 21 is formed by selectively diffusing a metal such as Ti or the like in only a part corresponding to the light guiding region portion in the substrate 1a in the titanium diffusing process when the waveguide is formed, thereby having a larger refractive index than another part (the substrate 1a), similarly to the optical waveguide 4 described before.

The light guiding region 21 is provided in a position separated by about 7 to 10 $\mu$m from the output waveguide 4b of the optical waveguide 4.

Actually, the travelling-wave electrode 2 is also formed on the output waveguide 4b (not shown in FIG. 1) in order to obtain wavelength chirp, whereby phase modulation is conducted in the output waveguide 4b in the optical modulator 20 of a Mach-Zehnder type.

For this, the travelling-wave electrode 2 is also formed on the light guiding region 21 (not shown in FIG. 1). However, since a voltage is also applied to the light guiding region 21 by the travelling-wave electrode 2 when the phase modulation is conducted, the refractive index of the light guiding region 21 is changed.

A change of the refractive index of the light guiding region 21 exerts an effect on the signal light leaking from the output waveguide 4b so that the modulated waveform is degraded.

For this, the light guiding region 21 is provided in a position separated by about 7 to 10 $\mu$m from the output waveguide 4b.

A shorter length of the optical waveguide 21 allows a smaller gap between the output waveguide 4b and the light guiding region 21.

The radiation light and the signal light mentioned above coming into the light guiding region 21 interfere with each other within the light guiding region 21, then are emitted from the light guiding region 21 to the inside of the substrate 1a.

The light (the radiation light, mainly) emitted from the light guiding region 21 further interferes with the signal light leaking from the Y-shaped recombining portion $R_2$ when being propagated inside the substrate 1a, then is emitted as monitor light (interference light) from the end surface on the outputting side of the substrate 1a.

Namely, the substrate 1a in the vicinity of a portion E of the output waveguide 4b functions as an interference light generating means for making the light emitted from the light guiding region 21 and the signal light leaking from the Y-shaped recombining portion $R_2$ interfere with each other to generate interference light, and emitting the interference light from the end surface on the outputting side of the substrate 1a.

Since the light guiding region 21 mainly guides the radiation light as stated above, a phase of the interference light emitted from the substrate 1a has an inverted phase of the signal light. Incidentally, setting of the phase of the interference light will be described later.

As shown in FIG. 1, the photo-detector 5 is disposed in the rear stage of the end surface on the outputting side of the substrate 1a, and the signal controlling circuit 10 is connected to a terminal $T_1$ of the photo-detector 5. A terminal $T_2$ of the photo-detector 5 is grounded.

In concrete, the photo-detector 5 is interposed, within the package 13, between the lens 8a arranged in the front stage of the optical fiber 9b for outputting and the end surface on the outputting side of the substrate 1a of the optical waveguide device 1 of a Mach-Zehnder type, as shown in FIG. 1.

As shown in FIGS. 1 through 3, the photo-detector 5 is formed by placing a bear chip 6 as a photo-detecting element on a ceramic substrate 7. The photo-detector 5 receives the monitor light (interference light) emitted from the end surface on the outputting side of the substrate 1a, converts the received interference light into an electric signal, and outputs the electric signal to the signal controlling circuit 10, thereby monitoring the interference light. An example of a size of the photo-detector 5 is shown in FIG. 7. In FIG. 7, reference numeral 5a denotes an electrode.

The signal controlling circuit 10 varies direct-current bias of an input electric signal to be applied to the travelling-wave electrode 2 according to a result of the monitoring by the photo-detector 5 (that is, a change of a light output electric signal from the photo-detector 5).

As stated above, in the optical modulator 20 of a Mach-Zehnder type, an operating point of the optical modulator 20 of a Mach-Zehnder type is generally shifted with time elapsed due to temperature drift, DC drift, stress and the like.

Figure 30:
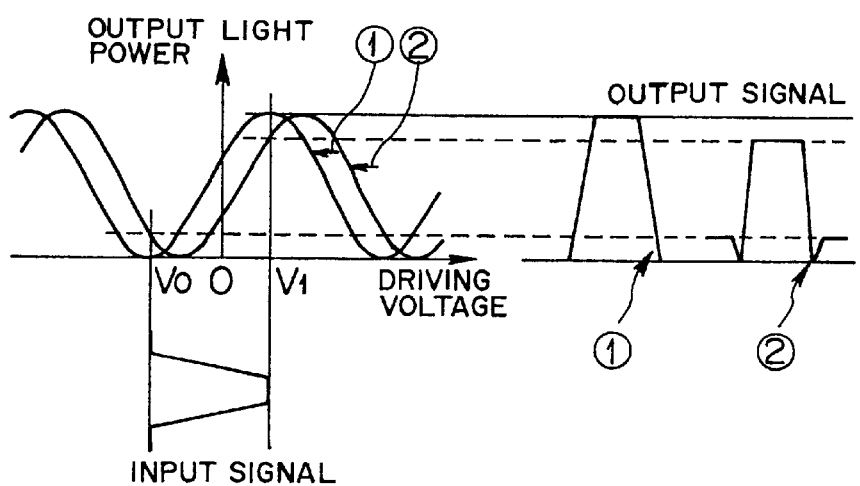
FIG. 30 is a diagram showing an input-output characteristic of the optical modulator of a Mach-Zehnder type.
Figure 31:
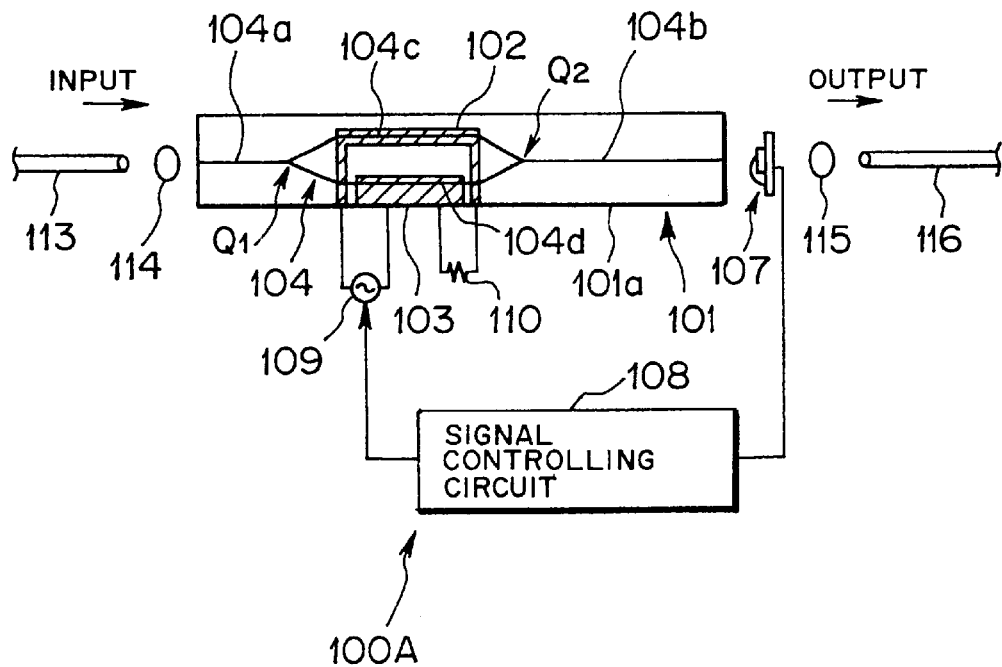
FIG. 31 is a schematic view of another example of the optical modulator of a Mach-Zehnder type.
Figure 32:
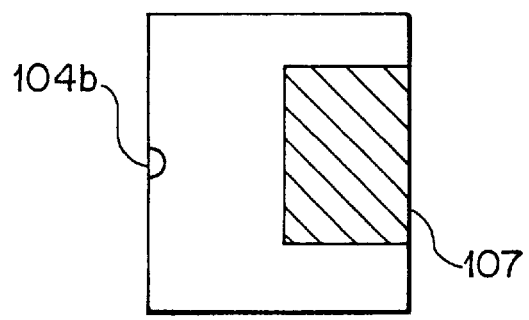
FIG. 32 is a side view of an outputting side of an optical waveguide device of a Mach-Zehnder type in the optical modulator shown in FIG. 31.

If optical modulation is conducted in a state where the operating point has been shifted, the extinction ratio is degraded as described before with reference to FIG. 30.

Accordingly, the photo-detector 5 monitors the interference light emitted from the end surface on the outputting side of the substrate 1a, and the signal controlling circuit 10 varies the direct-current bias of the input electric signal to be applied to the travelling-wave electrode 2 according to a result of the monitoring by the photo-detector 5, whereby the operating point of the optical modulator 20 of a Mach-Zehnder type can be controlled.

In the optical modulator 20 of a Mach-Zehnder type according to this embodiment, a phase of the interference light is set such that the interference light is emitted to a position separated by a desired distance from an optical waveguide end position (an end position of the output waveguide 4b of the optical waveguide 4) on the end surface on the outputting side of the substrate 1a.

In concrete, the photo-detector 5 is disposed in a position several hundreds μm [this distance is indicated by Y in FIG. 6(b), which is about 600 to 800 μm, or example] lower than the end position of the output waveguide 4b on the end surface on the outputting side of the substrate 1a in order to prevent the signal light to be inputted to the optical fiber 9b from the output waveguide 4b from being blocked.

The photo-detector 5 is disposed in a position separated by several hundreds μm from the end surface on the outputting side of the substrate 1a in order to further widen a radiation region of the interference light radiated from the end surface on the outputting side of the substrate 1a, as shown in FIGS. 1 and 6(a). FIGS. 1 and 6(a) show a case where the photo-detector 5 is disposed in a position separated by 700 μm from the end surface on the outputting side of the substrate 1a.

A phase and an intensity of the interference light is set by adjusting a fabrication condition of the optical waveguide 4.

Namely, the phase and the intensity of the interference light are set by varying a diffusion condition upon fabricating the optical waveguide 4 as the fabrication condition of the optical waveguide 4 so as to adjust a signal light power (signal light intensity) leaking from the Y-shaped recombining portion $R_2$ of the optical waveguide 4.

The phase and the intensity of the interference light can be alternatively set by varying a length D of the output waveguide 4b of the optical waveguide 4 [that is, a length D from the Y-shaped recombining portion $R_2$ of the optical waveguide 4 to the end surface on the outputting side of the substrate 1a; refer to FIGS. 1 and 6(a)] as the fabrication condition of the optical waveguide 4 so as to adjust the signal light power leaking when propagated in the output waveguide 4b.

According to this embodiment, a length of the output waveguide 4b is set to, for example, 4.5 mm or more in order to allow the interference light to be radiated on the entire of the end surface on the outputting side of the substrate 1a.

In the optical modulator 20 of a Mach-Zehnder type with the above structure according to this embodiment, when direct-current light from the semiconductor laser not shown is inputted to the package 13 through the optical fiber 9a, the incident light is inputted to the optical waveguide 4 of the optical waveguide device 1 of a Mach-Zehnder type.

In the optical waveguide device 1 of a Mach-Zehnder type, the light inputted from the input waveguide 4a is split by the Y-shaped splitting portion $R_1$, modulated by the travelling-wave electrode 2 and the grounding electrode 3 while being propagated in the intermediate waveguides 4c and 4d, then the modulated lights are recombined by the Y-shaped recombining portion $R_2$ of the optical waveguide 4.

Whereby, signal light and radiation light are generated at the Y-shaped recombining portion $R_2$, and the signal light is outputted from the output waveguide 4b, whereas the radiation light is radiated to the inside of the substrate 1a from the Y-shaped recombining portion $R_2$.

On the other hand, the signal light slightly leaks from the Y-shaped recombining portion $R_2$ to the inside of the substrate 1a.

The radiation light and the leaking signal light come into the light guiding region 21. The incident light is guided by the light guiding region 21 while being prevented from being scattered, then emitted to the inside of the substrate 1a.

The light emitted from the light guiding region 21 interferes with the signal light leaking from the Y-shaped recombining portion $R_2$ when propagated inside the substrate 1a, then emitted as interference light from the end surface on the outputting side of the substrate 1a.

Since the phase of the interference light is set by adjusting the fabrication condition of the optical waveguide 4 at this time as stated before, the interference light is emitted to a position separated by a desired distance from the end position of the output waveguide 4b on the end surface on the outputting side of the substrate 1a.

The emitted interference light is received by the photo-detector 5 disposed in a relevant position. The photo-detector 5 converts the received interference light into an electric signal, and outputs the electric signal to the signal controlling circuit 10.

As a result, the signal controlling circuit 10 varies direct-current bias of the input electric signal to be applied to the travelling-wave electrode 2 according to a change of the light output electric signal from the photo-detector 5, thereby controlling the operating point of the optical modulator 20 of a Mach-Zehnder type.

The signal light outputted from the output waveguide 4b of the optical waveguide device 1 of a Mach-Zehnder type is outputted via the lens 8a to the optical fiber 9b connected to the package 13.

Next, characteristics of the optical modulator 20 of a Mach-Zehnder type according to this embodiment will be described with reference to FIGS. 14 through 25.

Figure 14:
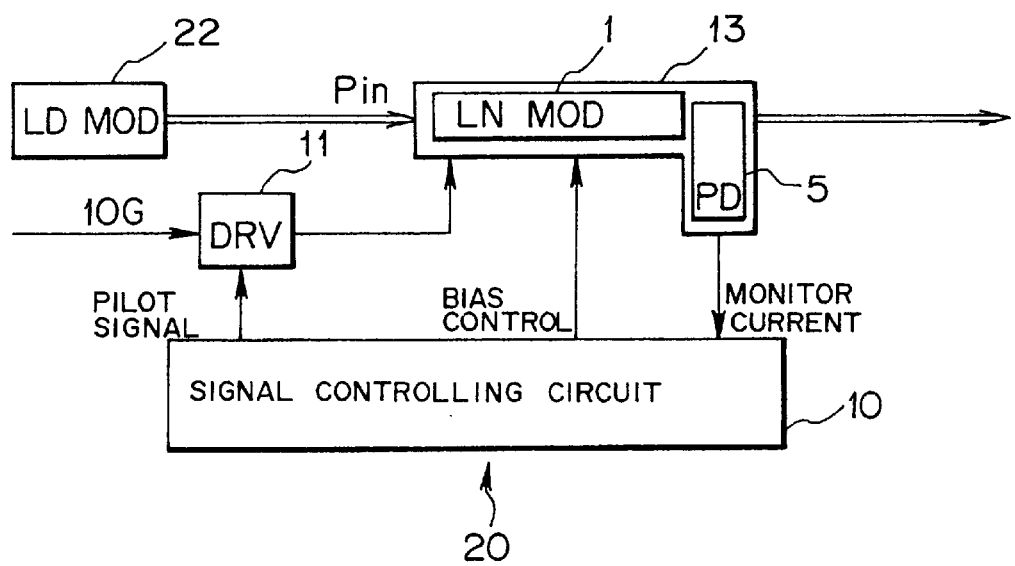
FIG. 14 is a diagram for illustrating a characteristic of an intensity of interference light.
Figure 15:
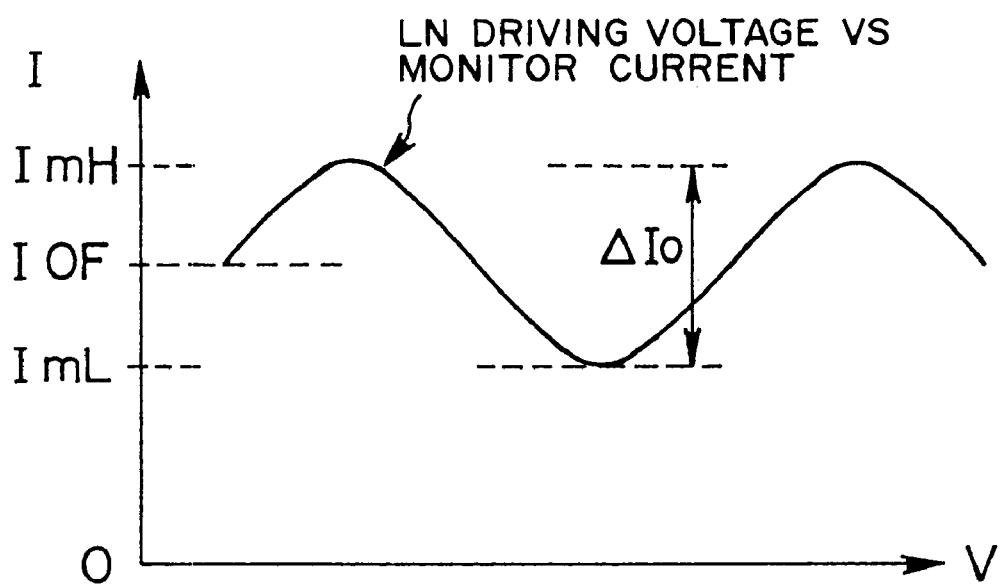
FIG. 15 is a diagram for illustrating the characteristic of the intensity of the interference light.
Figure 16:
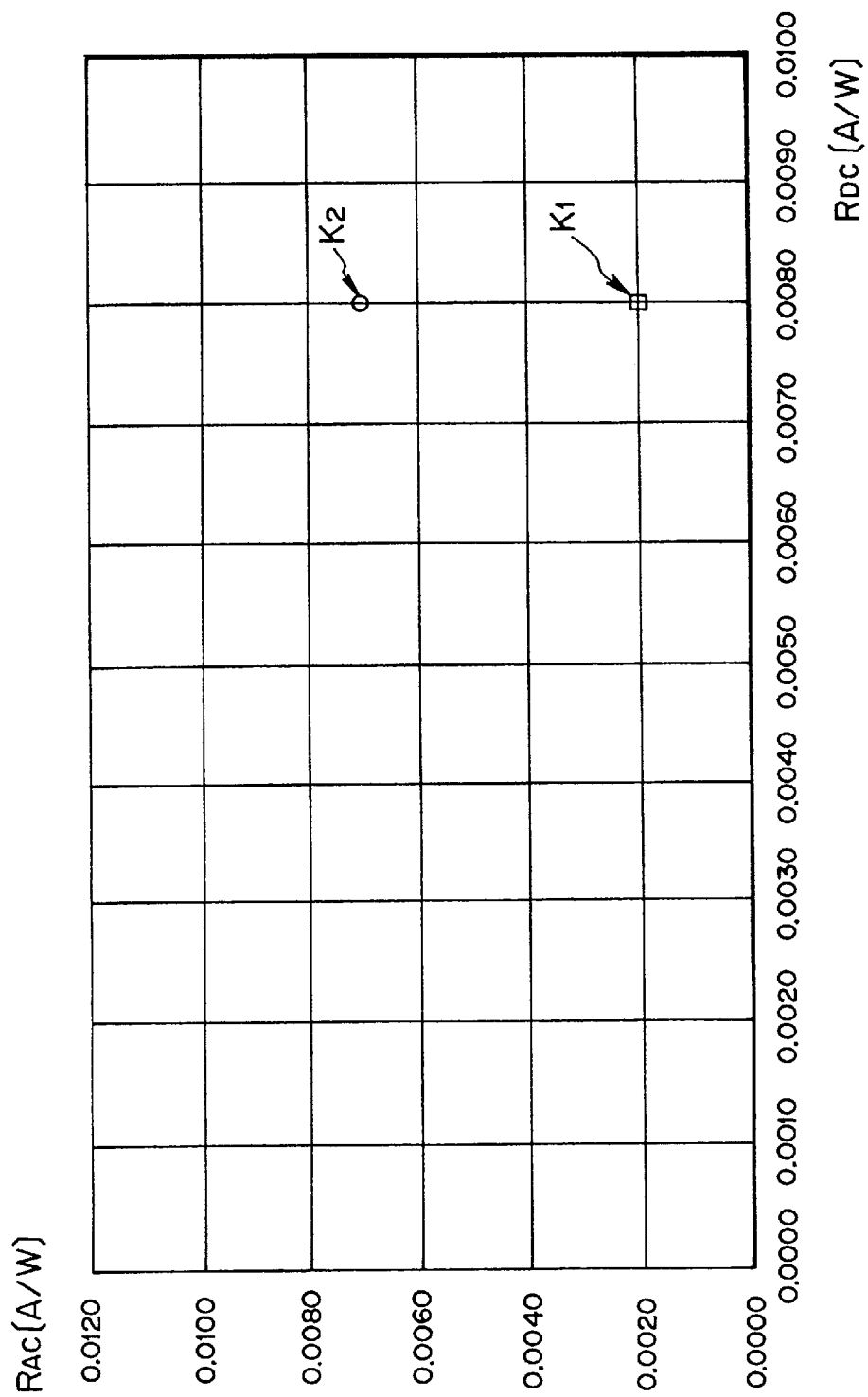
FIG. 16 is a diagram for illustrating the characteristic of the intensity of the interference light.
Figure 25:
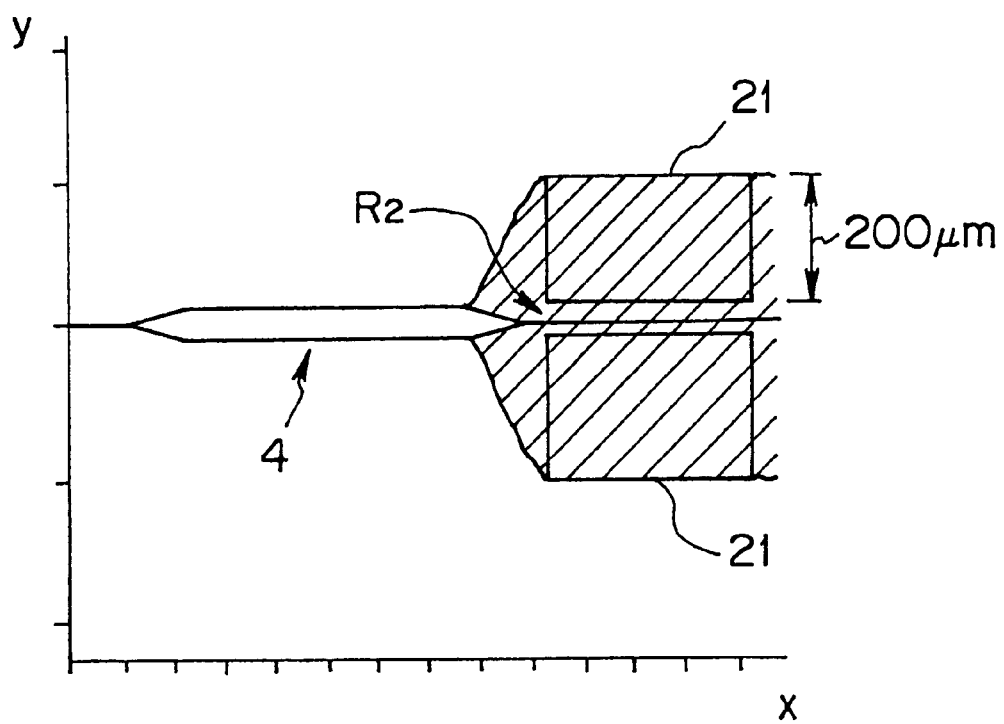
FIG. 25 is a diagram showing a result of the BPM simulation in the case where the light guiding region is provided.

FIGS. 14 through 16 illustrate a characteristic of interference light intensity. FIGS. 23 through 25 illustrate results of BPM (Beam Profile Method) simulation.

Figure 17:
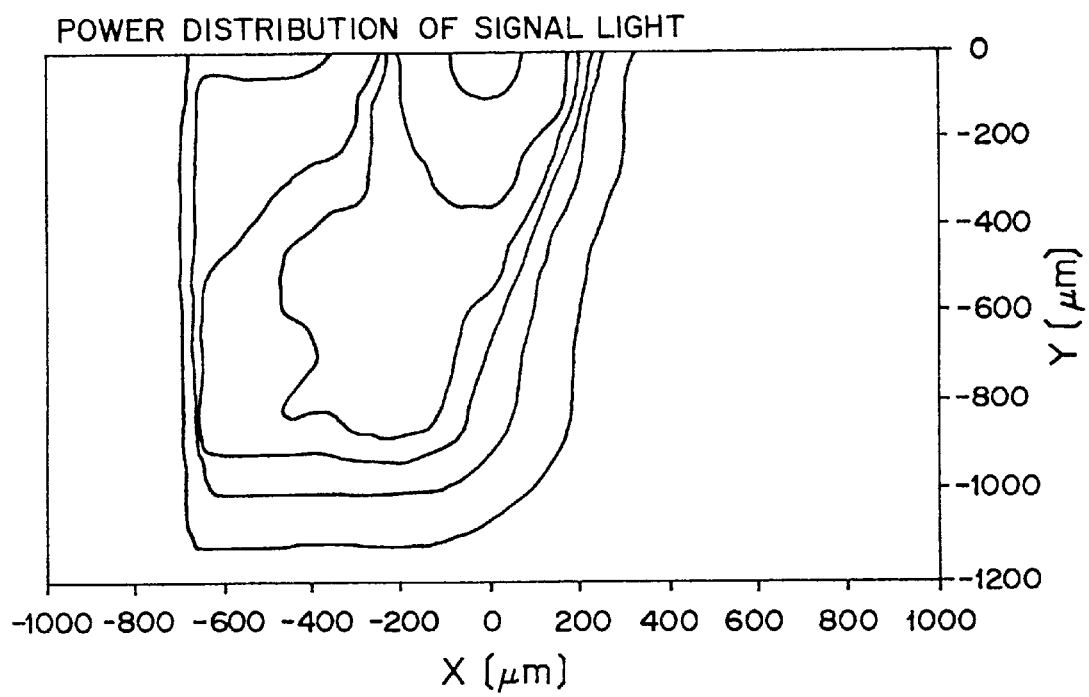
FIG. 17 is a diagram showing power distribution of the signal light in the case where the light guiding region is not provided.
Figure 19:
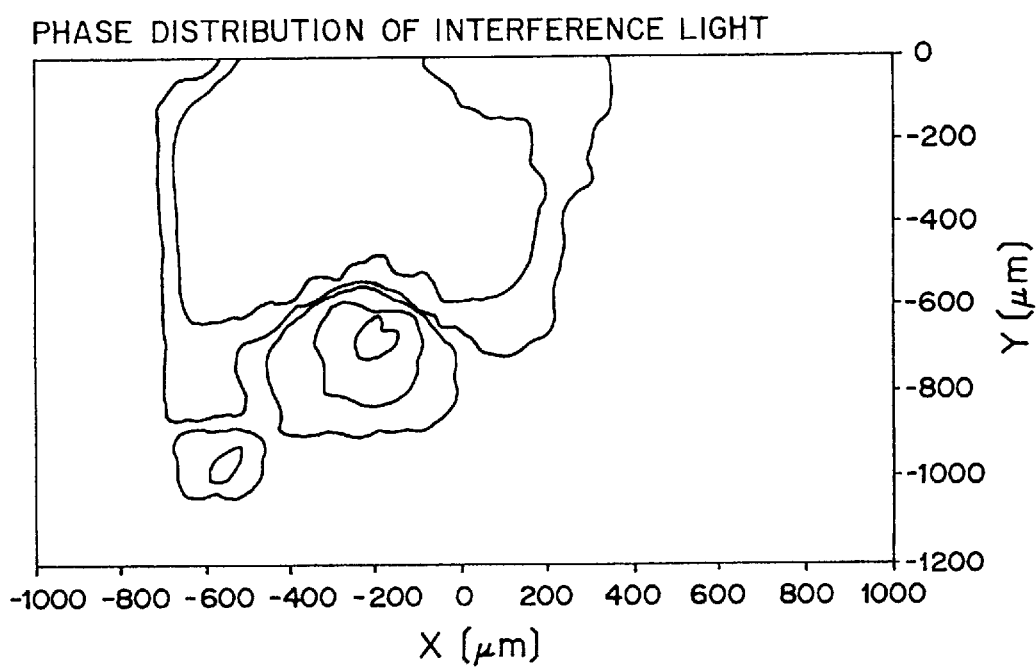
FIG. 19 is a diagram showing phase distribution of the interference light in the case where the light guiding region is not provided.
Figure 20:
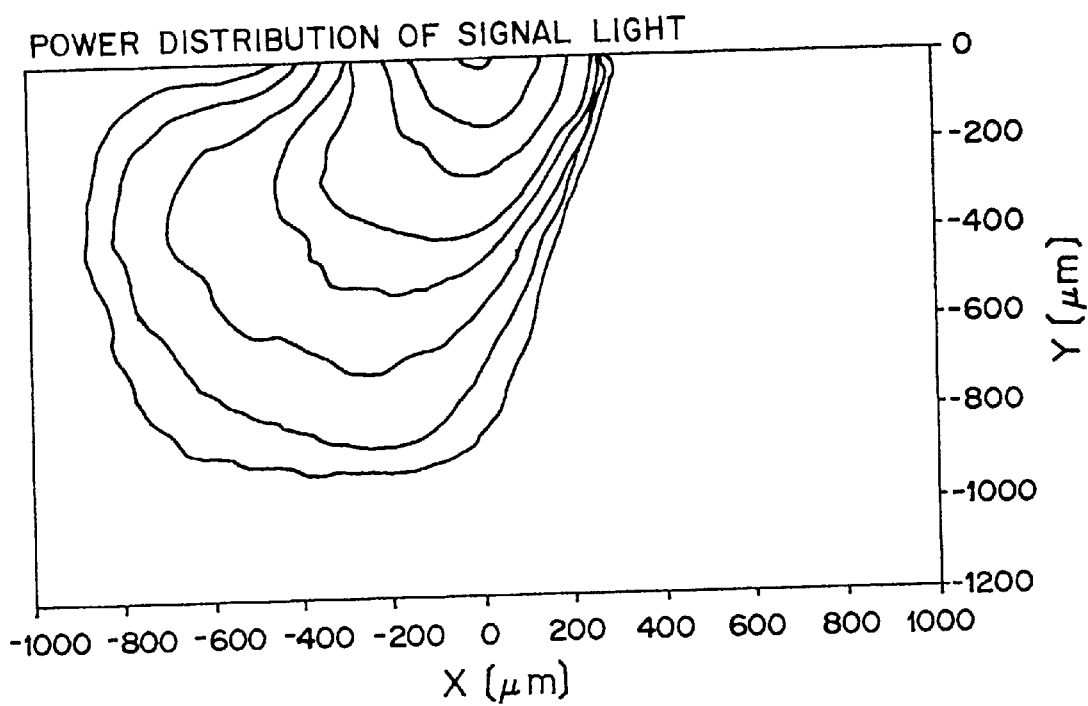
FIG. 20 is a diagram showing power distribution of the signal light in the case where the light guiding region is provided.
Figure 21:
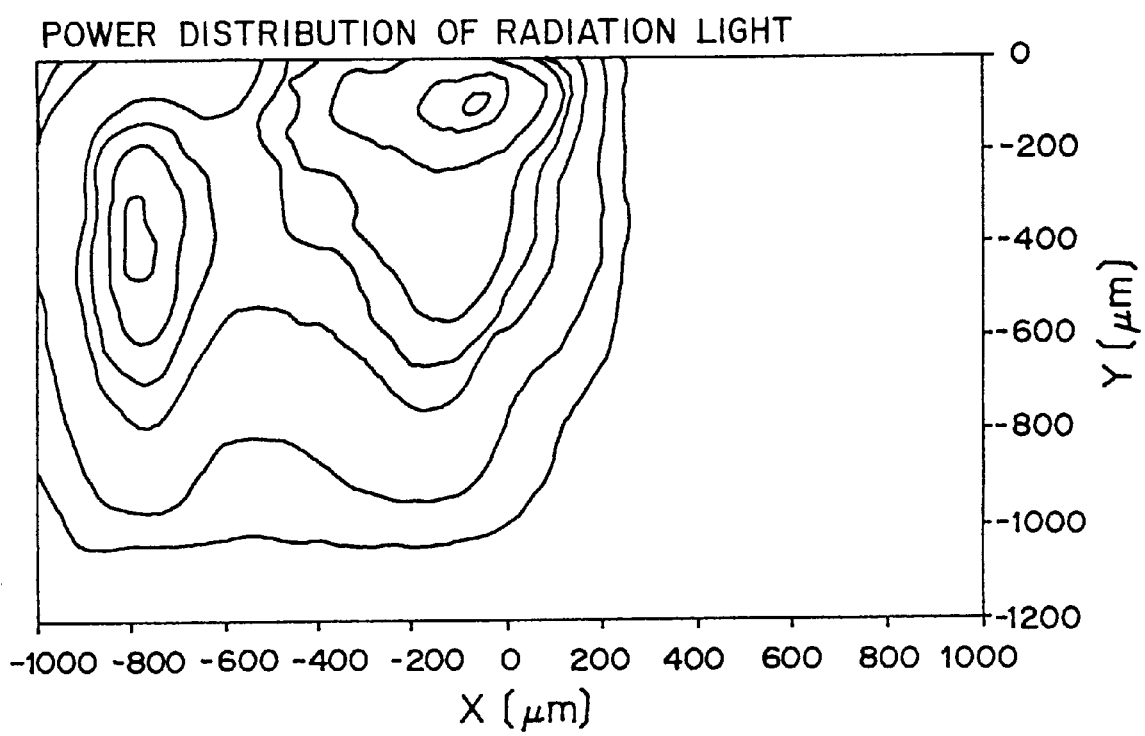
FIG. 21 is a diagram showing power distribution of the radiation light in the case where the light guiding region is provided.
Figure 22:
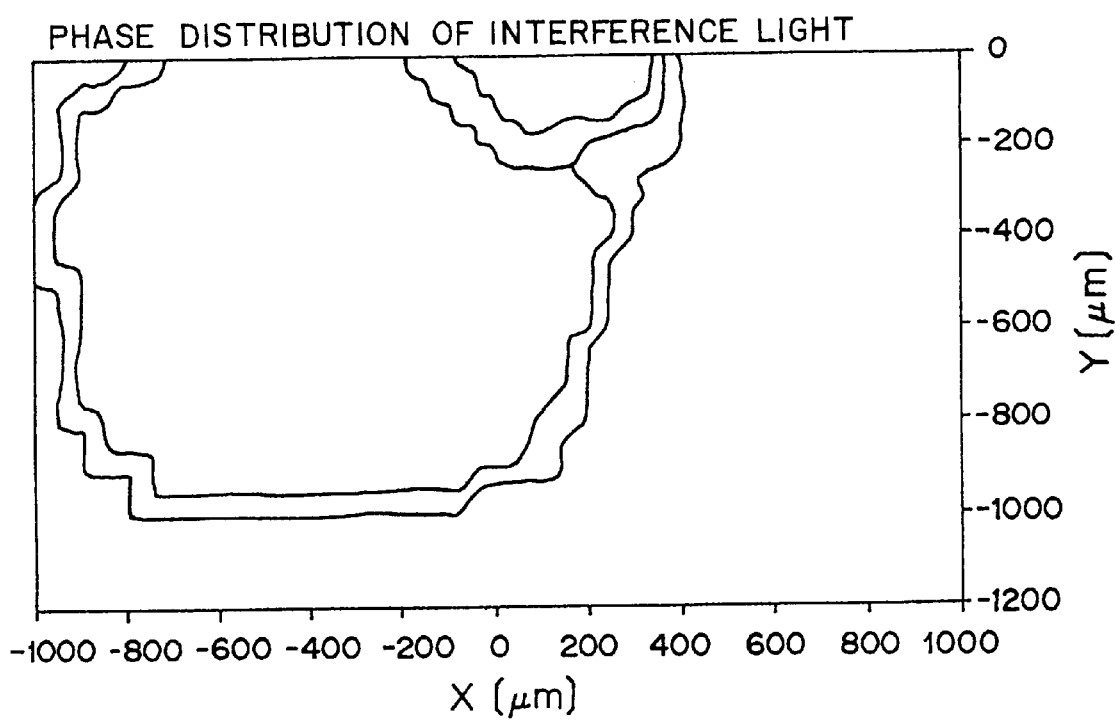
FIG. 22 is a diagram showing phase distribution of the interference light in the case where the light guiding region is provided.

FIGS. 17 and 20 illustrate power distribution of signal light. FIGS. 18 and 21 illustrate power distribution of radiation light. FIGS. 19 and 22 illustrate phase distribution of interference light.

(1) In the case where the light guiding region 21 is not provided in the vicinity of the output waveguide 4b:

FIGS. 17 and 18 show power distribution of the signal light and power distribution of the radiation light, respectively, in this case. From FIGS. 17 and 18, phase distribution of interference light is as shown in FIG. 19.

Since an intensity of the radiation light is small in this case, a phase of the interference light has the same phase as the signal light.

As shown in FIG. 19, the interference light is emitted to a position about 600 to 800 μm lower than the end position of the output waveguide 4b on the end surface on the outputting side of the substrate 1a.

In FIG. 23, a result of the BPM simulation in this case is shown. FIG. 23 shows distribution of light radiated or leaking from the Y-shaped recombining portion $R_2$ of the optical waveguide 4.

In this case, it is seen from FIG. 23 that the light emitted from the Y-shaped recombining portion $R_2$ is mostly emitted from end surfaces other than the end surface on the outputting side of the substrate 1a. In consequence, it is considered that monitor light (interference light) emitted from the end surface on the outputting side of the substrate 1a is scattered in an appreciable extent.

(2) In the case where the light guiding region 21 is provided in the vicinity of the output waveguide 4b:

FIGS. 20 and 21 show power distribution of the signal light and power distribution of the radiation light, respectively, in this case. From FIGS. 20 and 21, phase distribution of the interference light is as shown in FIG. 22.

Since an intensity of the radiation light is increased in this case, the interference light has an inverted phase of the signal light.

As shown in FIG. 22, the interference light is emitted to a position about 600 to 800 μm lower than the end position of the output substrate 4b on the end surface on the outputting side of the substrate 1a.

FIGS. 24 and 25 show results of the BPM simulation in this case.

FIGS. 24 and 25 show distribution of light radiated or leaking from the Y-shaped recombining portion $R_2$ of the light waveguide 4. In FIGS. 24 and 25, widths of the light guiding region 21 are 100 µm and 200 µm, respectively.

In this case, it is seen from FIGS. 24 and 25 that the light emitted from the Y-shaped recombining portion $R_2$ is guided in a direction of the end surface on the outputting side of the substrate 1a by the light guiding region 21. In consequence, it is considered that it is possible to decrease scattering of the monitor light (interference light) emitted from the end surface on the outputting side of the substrate 1a.

If a width of the light guiding region 21 is increased as shown in FIG. 25, it is possible to largely decrease scattering of the light emitted from the Y-shaped recombining portion $R_2$, and guide the radiation light to a wide region on the end surface on the outputting side of the substrate 1a.

In FIG. 16, there are shown an example of an interference light intensity $R_{DC}$ and $R_{AC}$ in the case where the light guiding region 21 is provided by reference character $K_2$, and an example of the interference light intensity $R_{DC}$ and $R_{AC}$ in the case where the light guiding region 21 is not provided by reference character $K_1$.

If an average value of the light output electric signals (current signals) from the photo-detector (PD) 5 is $I_{AVE}$, a difference between a peak value and a bottom value of the light output electric signal is $\Delta I_0$ (refer to FIGS. 14 and 15) and an output power from the signal light source (LD MOD) 22 shown in FIG. 14 is $P_{in}$, $R_{DC}$ and $R_{AC}$ are given by the following equations ①and ②, respectively:

$$R_{DC}=I_{AVE}/P_{in}(A/W) \quad ①$$

$$R_{AC}=\Delta I_o/P_{in}(A/W) \quad ②$$

By adjusting the interference light intensity such that a ratio of $R_{DC}$ to $R_{AC}$ is small (that is, by designing the optical modulator 20 of a Mach-Zehnder type such that $R_{DC}$ is smaller and $R_{AC}$ is larger), it is possible to improve the S/N ratio in the signal controlling circuit 10 and stabilize the operating point control of the optical modulator 20 of a Mach-Zehnder type.

If the light guiding region 21 is provided, it is possible to increase $R_{AC}$ as compared with a case where the light guiding region 21 is not provided, as shown in FIG. 16. It is therefore possible to improve the S/N ratio in the signal controlling circuit 10 and stabilize the operating point control in the optical modulator 20 of a Mach-Zehnder type.

In FIGS. 17 through 22, X (µm) entered along the horizontal axis and Y (µm) entered along the vertical axis correspond to X and Y (Y corresponds to the distance Y described before) shown in FIG. 6(b), respectively.

In FIGS. 17 through 22, in order to show that the distance Y mentioned above is a length in the downward direction from the end position of the output waveguide 4b on the end surface on the outputting side of the substrate 1a, negative numeral values are designated to Y entered along the vertical axis.

As to X entered along the horizontal axis, the end position of the output waveguide 4b on the end surface on the outputting side of the substrate 1a is indicated by 0, a length in the rightward direction from the end position of the output waveguide 4b is indicated by a positive numeral value, whereas an a length in the leftward direction is indicated by a negative numeral value.

In FIGS. 17 through 22, power distribution of the signal light, power distribution of the radiation light, or phase distribution of the interference light is asymmetric. A reason of this is that the optical waveguide device 1 of a Mach-Zehnder type with the end surface on the outputting side of the substrate 1a obliquely cut when looked from the above is used in order to diminish reflected feedback light of the emitted light (refer to FIG. 1).

The optical modulator 20 of a Mach-Zehnder type according to the embodiment of this invention guides light radiated or leaking from the optical waveguide 4 by the light guiding region 21, besides using interference light of the light emitted from light guiding region 21 and signal light leaking from the optical waveguide 4 as monitor light used when the operating point is controlled, thereby increasing an intensity of the monitor light (interference light) emitted from the end surface on the outputting side of the substrate 1a while adjusting a position on the end surface on the outputting side of the substrate 1a to which the monitor light is emitted.

Figure 28:
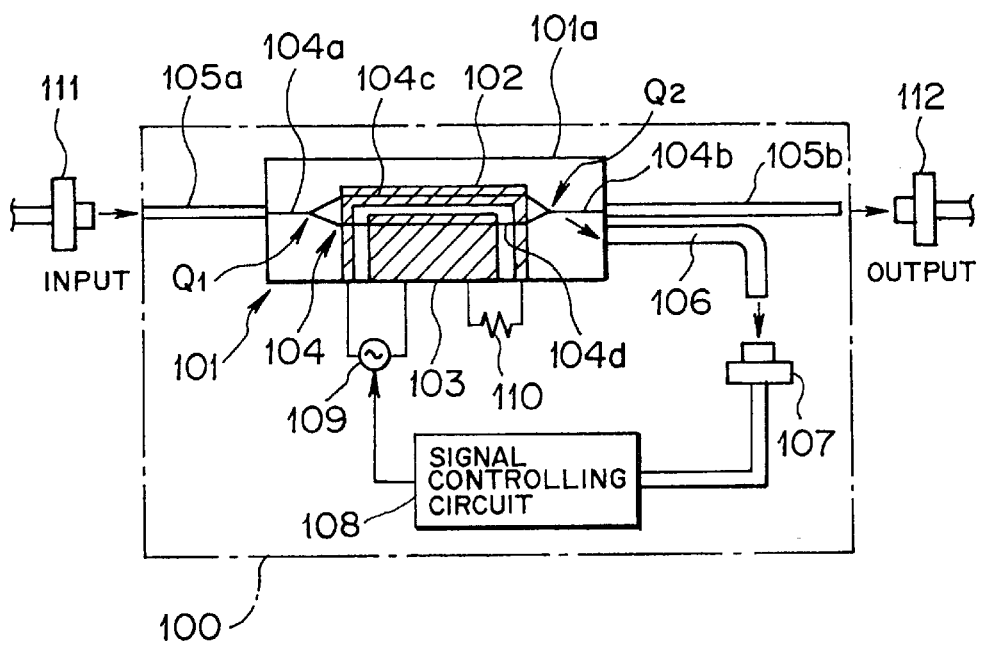
FIG. 28 is a schematic view of an example of an optical modulator of a Mach-Zehnder type.
Figure 29:
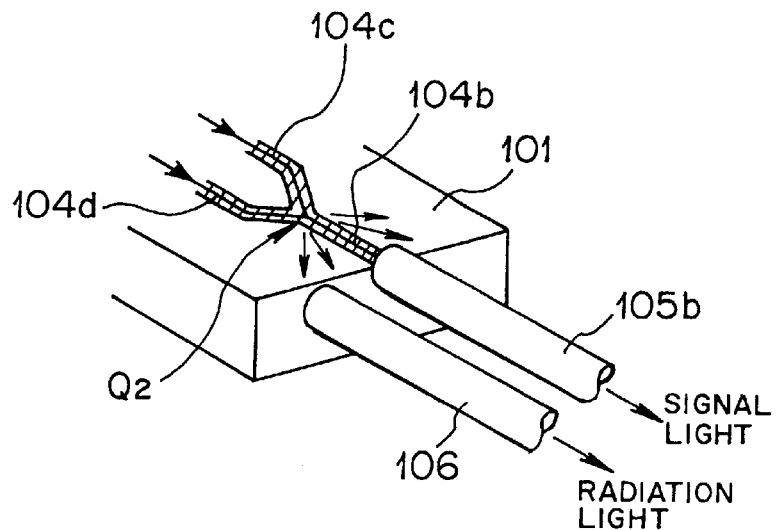
FIG. 29 is a perspective view of the optical modulator of a Mach-Zehnder type shown in FIG. 28 looking from an outputting side thereof.

It is therefore possible to dispose the optical fiber 9b to which the modulated signal light is inputted and the photo-detector 5 receiving the interference light a desired distance apart. As a result, it becomes unnecessary to provide an optical fiber for monitoring (refer to reference numeral 106) as shown in FIG. 28, and it is possible to facilitate a design of the mechanism of the optical modulator 20 of a Mach-Zehnder type.

Further, it is possible to stably control the operating point of the optical modulator 20 of a Mach-Zehnder type, which can prevent degradation of the extinction ratio of the signal light due to shift of the operating point of the optical modulator 20 of a Mach-Zehnder type so as to enable stable optical modulation.

The photo-detector 5 is disposed in a position a predetermined length (the distance Y) lower than the end position of the output waveguide 4b on the end surface on the outputting side of the substrate 1a. It is thereby possible to prevent the signal light to be outputted to the optical fiber 9b from the output waveguide 4b of the optical waveguide 4 from being blocked.

The photo-detector 5 is disposed in a position separated by several hundreds µm (about 700 µm, for example) from the end surface on the outputting side of the substrate 1a. It is thereby possible to further widen a radiation region of the interference light emitted from the end surface on the outputting side of the substrate 1a.

If the length D of the output waveguide 4b of the optical waveguide 4 is set to, for example, 4.5 mm or more, it is possible to radiate the interference light on the entire of the end surface on the outputting side of the substrate 1a so that the interference light can be readily monitored by the photo-detector 5.

Figure 9A:
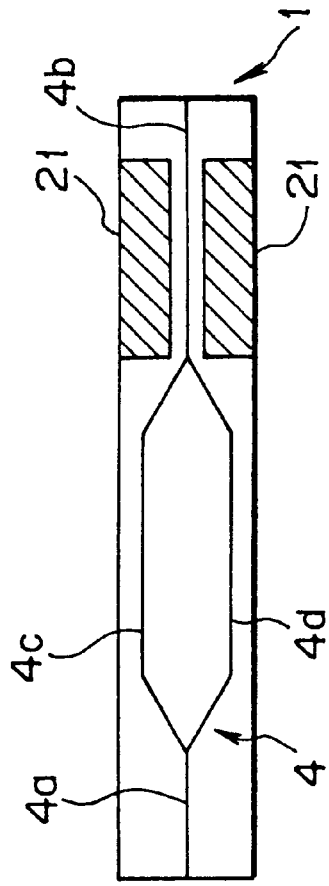
FIGS. 9(a) through 9(c) are diagrams for illustrating shapes of a light guiding region.
Figure 9B:
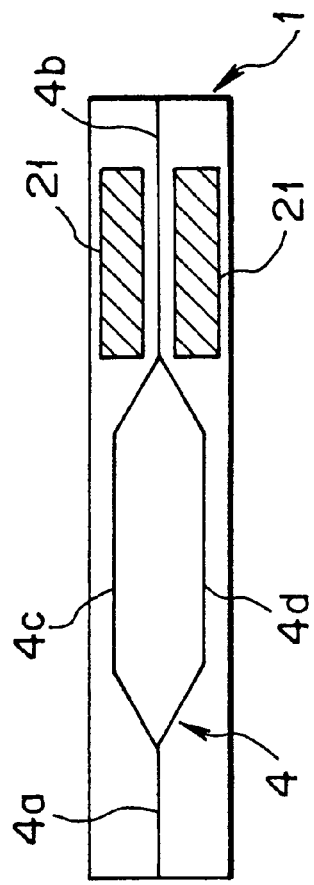

This embodiment has been described by way of an example where a shape of the light guiding region 21 is as shown in FIG. 9(a) to extend to the sides of the substrate. However, the light guiding region 21 may have a shape as shown in FIG. 9(b) (to be positioned inward from the sides of the substrate) or 9(c).

Figure 9C:
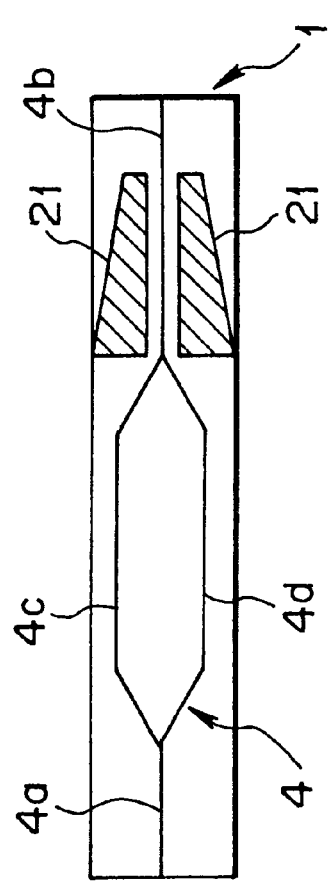

Particularly, if the light guiding region 21 has a shape such that a width thereof is gradually narrowed as getting closer to the end surface on the outputting side of the substrate 1a as shown in FIG. 9(c), it is possible to increase condensation of the light radiated or leaking from the optical waveguide 4.

Figures 10A, 10B, 10C:
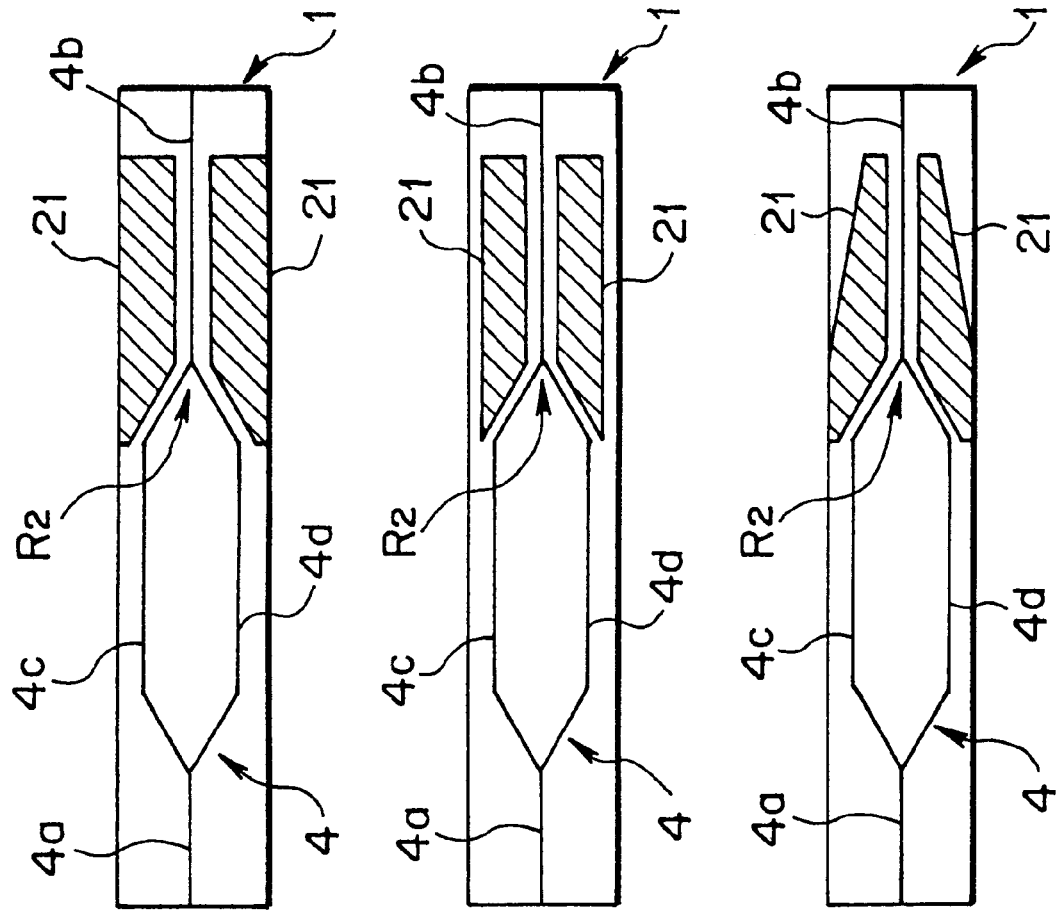
FIGS. 10(a) through 10(c) are diagrams for illustrating positions of the light guiding region.

If the light guiding region 21 is provided in the vicinity of an outputting-side waveguide with a recombining portion formed by the Y-shaped recombining portion $R_2$ (having angled portions meeting the output waveguide) and the output waveguide 4b of the optical waveguide 4, as shown in FIGS. 10(a) through 10(c), it is possible to further increase condensation of light radiated or leaking from the optical waveguide 4. That is, the light guiding portion 21 is further provided between the angled portions and the sides of the substrate.

This embodiment has been described by way of an example where the light guiding region 21 is provided on the both sides of the output waveguide 4b. However, it is alternatively possible to provide the light guiding region 21 on only one side of the output waveguide 4b.

Further, this embodiment has been described by way of an example where the light guiding region 21 is formed in the titanium diffusing process to diffuse a metal such as Ti in the substrate 1a. However, it is alternatively possible to form the light guiding region 21 in an ion exchanging process.

Figure 8A:
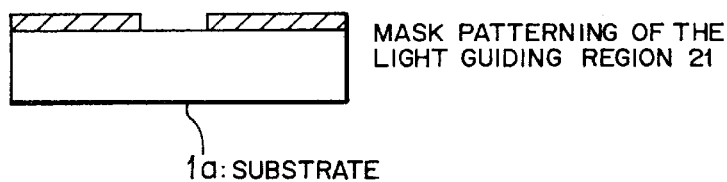
FIGS. 8(a) through 8(c) are diagrams for illustrating a proton exchanging process.
Figure 8B:
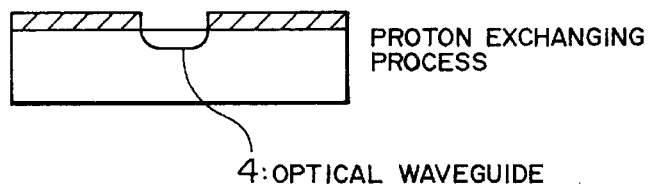

Namely, a mask pattern of the light guiding region 21 is formed on the substrate 1a [refer to FIG. 8(a)], then heat-treated with, for example, pyrophosphoric acid to conduct a proton exchanging process [refer to FIG. 8(b)], whereby the light guiding region 21 may be formed.

Figure 8C:
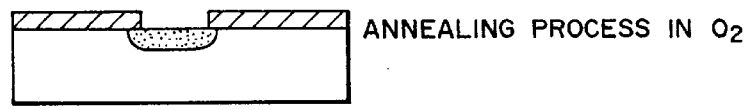

A proportion of the proton exchange in the light guiding region 21 can be adjusted by an annealing process in oxygen (in $O_2$) at a high temperature of 350° C. [refer to FIG. 8(c)].

The light waveguide 4 may be formed in the proton exchanging process.

If the signal light can be prevented from leaking from the optical waveguide 4 by changing the fabrication condition of the optical waveguide 4, the light guiding region 21 guides only the radiation light radiated from the optical waveguide 4.

Figure 11:
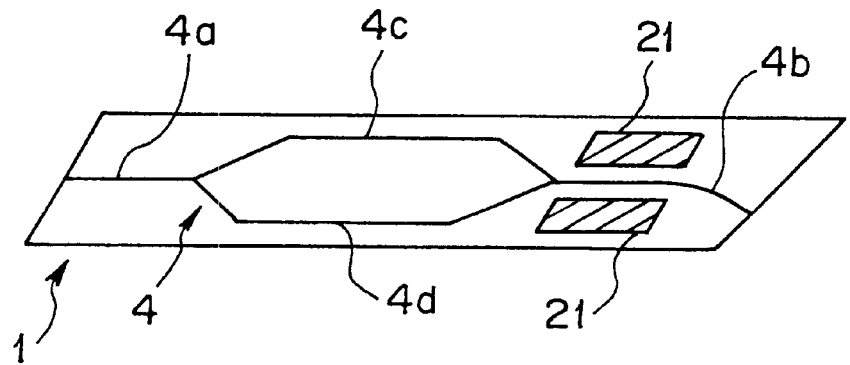
FIG. 11 is a diagram for illustrating a shape of an output waveguide.

If the output waveguide 4b is formed by a curved waveguide having a curved portion as shown in FIG. 11, light emitted from the end surface on the outputting side of the substrate 1a can be prevented from again coming into the intermediate waveguides 4c and 4d, and the like.

(b) Description of modification of the embodiment of the invention

Figure 26:
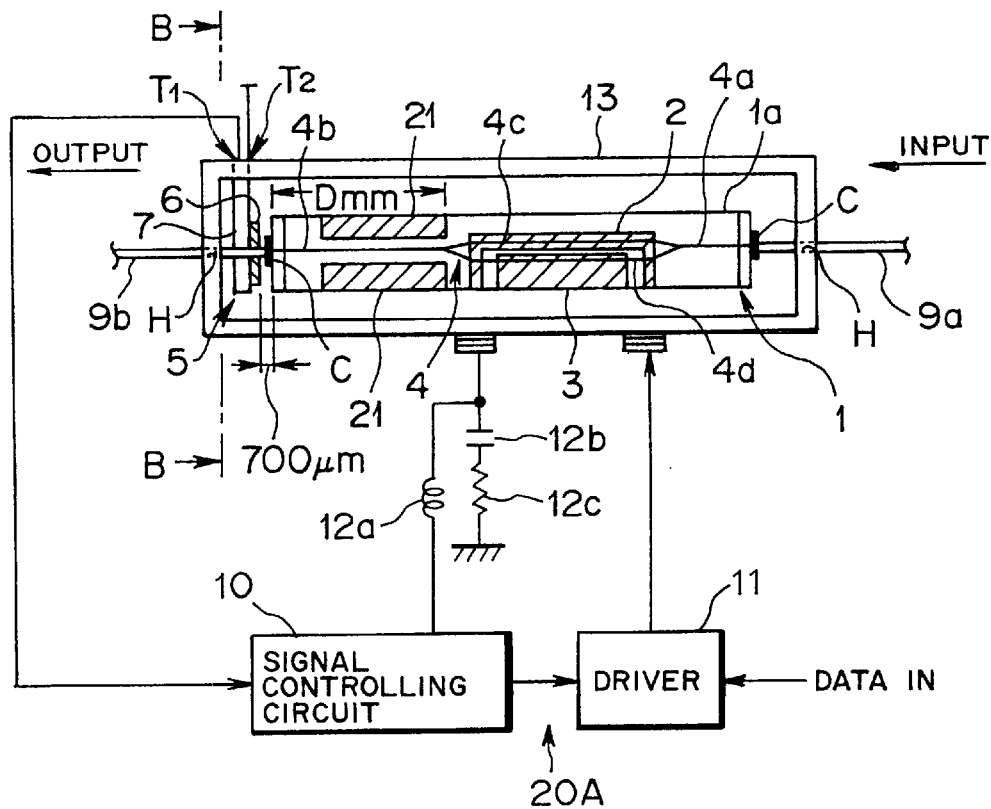
FIG. 26 is a schematic view of a modified optical modulator according to the embodiment of this invention.

FIG. 26 is a schematic view of a modified optical modulator according to the embodiment of this invention.

The optical modulator shown in FIG. 26 is an optical modulator of a Mach-Zehnder type in a fiber direct-connect system. Similarly to the optical modulator shown in FIG. 1, the optical modulator shown in FIG. 26 is used, in a transmitting unit of, for example, an ultra high-speed optical communication system, as an external optical modulator for modulating light emitted from a signal light source such as a semiconductor laser or the like.

Figure 27:
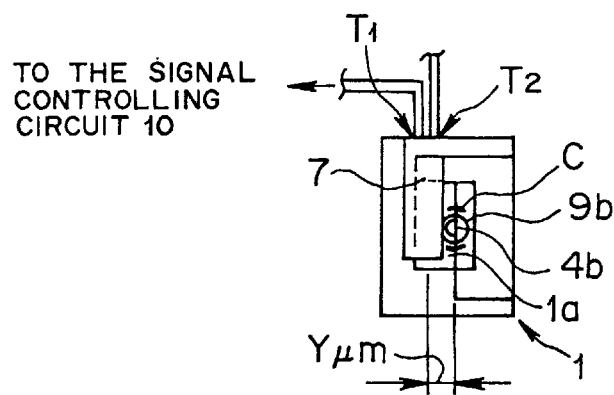
FIG. 27 is a sectional view of the optical modulator shown in FIG. 26 taken along line B—B.

FIG. 27 is a sectional view of the optical modulator 20A of a Mach-Zehnder type shown in FIG. 26 taken along line B—B.

The optical modulator 20A of a Mach-Zehnder type shown in FIG. 26 is formed similarly to the optical modulator 20 of a Mach-Zehnder type shown in FIG. 1, excepting that the optical fibers 9a and 9b are directly connected to the optical waveguide device 1 of a Mach-Zehnder type within the package 13.

Namely, there are formed two holes H in the package 13, into which the optical fibers 9a and 9b are inserted, as shown in FIG. 26.

A tip of the optical fiber 9a is fixed to an end of the input waveguide 4a on the end surface on the inputting side of the substrate 1a of the optical waveguide device 1 of a Mach-Zehnder type, whereas a tip of the optical fiber 9b is fixed to an end of the output waveguide 4b on the end surface on the outputting side of the substrate 1a of the optical waveguide device 1 of a Mach-Zehnder type, both with an adhesive C or the like.

In this case, the photo-detector 5 is disposed in the rear stage of the end surface on the outputting side of the substrate 1a to which the optical fiber 9b is connected, below the optical fiber 9b, as shown in FIGS. 26 and 27.

The optical modulator 20A of the Mach-Zehnder type may achieve the same functions and effects as the above-described optical modulator 20 of a Mach-Zehnder type according to the embodiment.

In particular, since the optical modulator 20A of a Mach-Zehnder type is in a fiber direct-connect system, the phase of the interference light is arbitrarily set, and optical fiber 9b and the photo-detector 5 are disposed a desired distance apart, whereby the optical modulator 20A of a Mach-Zehnder type may be readily fabricated.

In the optical modulator 20A of a Mach-Zehnder type, it is possible to provide the light guiding region 21 on only one side of the output waveguide 4b, as well.

What is claimed is:

1. An optical modulator comprising:
   a substrate having a top, a bottom and a plurality of sides connecting the top and the bottom;
   an optical waveguide formed on the top of said substrate, the optical waveguide having two subwaveguides, a combining portion where the subwaveguides meet and an output waveguide, the optical waveguide emitting at least one of radiation light and signal leakage light;
   an electrode formed on the top of said substrate to control light propagated in said optical waveguide; and
   a light guiding unit for guiding radiation light or signal leakage light from said optical waveguide to one of the plurality of sides of the substrate.

2. The optical modulator according to claim 1 further comprising a signal controlling circuit connected to the electrode to vary a direct-current bias applied to said electrode according to a change in the radiation light or signal leakage light guided by the light guiding unit.

3. The optical modulator according to claim 1, wherein said light guiding unit has a refractive index different from a refractive index of said substrate.

4. The optical modulator according to claim 1, wherein said light guiding unit guides radiation light from said optical waveguide.

5. The optical modulator according to claim 1, wherein said light guiding unit guides radiation light and the signal leakage light from said optical waveguide.

6. The optical modulator according to claim 1, wherein the combining portion couples the subwaveguides to the output waveguide, and said light guiding unit is provided in the vicinity of the output waveguide.

7. The optical modulator according to claim 1, wherein said light guiding unit is formed of titanium diffused into the substrate.

8. The optical modulator according to claim 6, wherein said output waveguide is substantially linear.

9. The optical modulator according to claim 6, wherein said output waveguide has a curved portion.

10. The optical modulator according to claim 1, wherein the optical waveguide is a Mach-Zehnder optical waveguide.

11. The optical modulator according to claim 1, wherein the electrode causes light travelling in one of the subwaveguides to have a different phase than light travelling in the other of the subwaveguides such that destructive interference occurs at the combining portion to produce radiation light.

12. The optical modulator according to claim 1, wherein the light guiding unit has a larger refractive index than the refractive index of the substrate.

13. The optical modulator according to claim 2, further comprising a photo-detector positioned in the vicinity of the one of the plurality of sides of the substrate to receive the radiation light or signal leakage light guided by the light guiding unit, the photo-detector being connected to the signal controlling circuit.

14. The optical modulator according to claim 13, wherein
the combining portion couples the subwaveguides to the output waveguide,
the optical modulator further comprises an output optical fiber and a lens positioned between the output waveguide and the output optical fiber, and
the photo-detector is positioned between the substrate and the lens.

15. The optical modulator according to claim 13, wherein
the combining portion couples the subwaveguides to the output waveguide with the output waveguide running toward a rear of the substrate,
the optical modulator further comprises an output optical fiber, and
both the output optical fiber and the photo-detector are positioned at rear of the substrate.

16. The optical modulator according to claim 13, wherein said photo-detector is formed of a photo-detecting element on a plate member.

17. The optical modulator according to claim 13, wherein
the combining portion couples the subwaveguides to the output waveguide,
the output waveguide has a depth in the substrate from a surface of the substrate, and
the photo-detector is positioned further from the surface of the substrate in the depth direction than the output waveguide.

18. The optical waveguide according to claim 17, wherein the photo-detector is positioned from 600 $\mu$m to 800 $\mu$m further from the surface of the substrate in the depth direction than the output waveguide.

19. The optical modulator according to claim 6, wherein the light guiding unit is provided on one side of the output waveguide.

20. The optical modulator according to claim 6, wherein the light guiding unit is provided on both sides of the output waveguide.

21. The optical modulator according to claim 6, wherein the light guiding unit is separated from the output waveguide by a distance of from 7 $\mu$m to 10 $\mu$m.

22. The optical modulator according to claim 6, wherein
the output waveguide extends between sides of the substrate which run substantially parallel to the output waveguide, and
the light guiding unit is provided on both sides of the output waveguide to extend to the sides of the substrates.

23. The optical modulator according to claim 6, wherein
the output waveguide extends between sides of the substrate which run substantially parallel to the output waveguide, and
the light guiding unit is provided on both sides of the output waveguide and is positioned inward on the substrate from the sides of the substrate.

24. The optical modulator according to claim 6, wherein the light guiding unit is provided on both sides of the output waveguide and has a width which decreases away from the combining portion.

25. The optical modulator according to claim 22, wherein
the subwaveguides have angled portions which angle inward towards each other to meet at the combining portion, and
the light guiding unit is further provided between the angled portions and the sides of the substrate.

26. The optical modulator according to claim 23, wherein
the subwaveguides have angled portions which angle inward towards each other to meet at the combining portion, and
the light guiding unit is further provided between the angled portions and the sides of the substrate.

27. The optical modulator according to claim 24, wherein
the output waveguide extends between sides of the substrate which run substantially parallel to the output waveguide,
the subwaveguides have angled portions which angle inward towards each other to meet at the combining portion, and
the light guiding unit is further provided between the angled portions and the sides of the substrate.

28. An optical modulator comprising:
a substrate having a top, a bottom and a plurality of sides connecting the top and the bottom;
an optical waveguide formed on the top of said substrate, the optical waveguide having two subwaveguides, a combining portion where the subwaveguides meet and an output waveguide, the optical waveguide emitting radiation light and signal leakage light;
an electrode formed on the top of the substrate to control light propagated in said optical waveguide; and
an interference light generating device to receive the radiation light and signal leakage light from the optical waveguide, to cause the radiation light to interfere with the signal leakage light to thereby generate interference light and to guide the interference light to one of the plurality of sides of the substrate.

29. The optical modulator according to claim 28, wherein said light guiding unit has a refractive index different from a refractive index of said substrate.

30. The optical modulator according to claim 28, wherein said light guiding unit is formed of titanium diffused into the substrate.

31. The optical modulator according to claim 28, wherein said output waveguide is substantially linear.

32. The optical modulator according to claim 28, wherein said output waveguide has a curved portion.

33. The optical modulator according to claim 28, wherein said substrate is a lithium niobate substrate.

34. The optical modulator according to claim 28, wherein the optical waveguide is a Mach-Zehnder optical waveguide.

35. The optical modulator according to claim 28, wherein the electrode causes light travelling in one of the subwaveguides to have a different phase than light travelling in the other of the subwaveguides such that destructive interference occurs at the combining portion to produce radiation light.

36. The optical modulator according to claim 28, wherein the light guiding unit has a larger refractive index than the refractive index of the substrate.

37. The optical modulator according to claim 28 further comprising a signal controlling circuit connected to the electrode to vary a direct-current bias applied to said electrode according to a change in the interference light guided by the light guiding unit.

38. The optical modulator according to claim 37, further comprising a photo-detector positioned in the vicinity of the one of the plurality of sides of the substrate to receive the interference light guided by the light guiding unit, the photo-detector being connected to the signal controlling circuit.

39. The optical modulator according to claim 38, wherein
the combining portion couples the subwaveguides to the output waveguide,
the optical modulator farther comprises an output optical fiber and a lens positioned between the output waveguide and the output optical fiber, and
the photo-detector is positioned between the substrate and the lens.

40. The optical modulator according to claim 38, wherein
the combining portion couples the subwaveguides to the output waveguide with the output waveguide running toward a rear of the substrate,
the optical modulator further comprises an output optical fiber, and
both the output optical fiber and the photo-detector are positioned at the rear of the substrate.

41. The optical modulator according to claim 38, wherein
the combining portion couples the subwaveguides to the output waveguide,
the output waveguide has a depth in the substrate from a surface of the substrate, and
the photo-detector is positioned further from the surface of the substrate in the depth direction than the output waveguide.

42. The optical waveguide according to claim 41, wherein the photo-detector is positioned from 600 µm to 800 µm further from the surface of the substrate in the depth direction than the output waveguide.

43. The optical modulator according to claim 38, wherein said photo-detector is formed of a photo-detecting element on a plate member.

44. The optical modulator according to claim 43, wherein said plate member is a ceramic substrate.

45. The optical modulator according to claim 43, wherein said photo-detecting element is a bear chip.

46. The optical modulator according to claim 28, wherein
the combining portion couples the subwaveguides to the output waveguide, and
said light guiding unit is provided in the vicinity of the output waveguide.

47. The optical modulator according to claim 46, wherein the light guiding unit is provided on one side of the output waveguide.

48. The optical modulator according to claim 46, wherein the light guiding unit is provided on both sides of the output waveguide.

49. The optical modulator according to claim 46, wherein the light guiding unit is separated from the output waveguide by a distance of from 7 µm to 10 µm.

50. The optical modulator according to claim 46, wherein
the output waveguide extends between sides of the substrate which run substantially parallel to the output waveguide, and
the light guiding unit is provided on both sides of the output waveguide to extend to the sides of the substrates.

51. The optical modulator according to claim 46, wherein
the output waveguide extends between sides of the substrate which run substantially parallel to the output waveguide, and
the light guiding unit is provided on both sides of the output waveguide and is positioned inward on the substrate from the sides of the substrate.

52. The optical modulator according to claim 46, wherein the light guiding unit is provided on both sides of the output waveguide and has a width which decreases away from the combining portion.

53. The optical modulator according to claim 50, wherein
the subwaveguides have angled portions which angle inward towards each other to meet at the combining portion, and
the light guiding unit is further provided between the angled portions and the sides of the substrate.

54. The optical modulator according to claim 51, wherein
the subwaveguides have angled portions which angle inward towards each other to meet at the combining portion, and
the light guiding unit is further provided between the angled portions and the sides of the substrate.

55. The optical modulator according to claim 50, wherein
the output waveguide extends between sides of the substrate which run substantially parallel to the output waveguide,
the subwaveguides have angled portions which angle inward towards each other to meet at the combining portion, and
the light guiding unit is further provided between the angled portions and the sides of the substrate.

56. The optical modulator according to claim 28, wherein said interference light has an inverted phase from that of said signal light.

57. The optical modulator according to claim 16, wherein said plate member is a ceramic substrate.

58. The optical modulator according to claim 16, wherein said photo-detecting element is a bear chip.

59. The optical modulator according to claim 1, wherein said substrate is a lithium niobate substrate.

60. A method of forming an optical modulator, comprising the steps of:
(a) forming an optical waveguide on a top of a substrate having a top, a bottom and a plurality of sides connecting the top, and the bottom, the optical waveguide having two subwaveguides, a recombining portion where the subwaveguides meet and an output waveguide, the optical waveguide emitting radiation light or signal leakage light;
(b) forming an electrode on the top of the substrate to control light travelling in the optical waveguide; and
(c) forming a light guiding unit on the substrate for guiding radiation light or signal leakage light from the optical waveguide to one of the plurality of sides of the substrate.

61. The method according to claim 60 wherein the light guiding unit is formed by diffusing titanium into the substrate.

62. The method according to claim 60 wherein the light guiding unit is formed by conducting an ion exchange process with the substrate.

63. An optical modulator comprising:
a substrate having a top, a bottom and a plurality of sides connecting the top and the bottom;
an optical waveguide formed on the top of said substrate, the optical waveguide having two subwaveguides and a combining portion where the subwaveguides meet, the optical waveguide emitting at least one of radiation light and signal leakage light;

an electrode formed on the top of said substrate to control light propagated in said optical waveguide; and a light guiding unit, separate from the optical waveguide, for guiding radiation light or signal leakage light from said optical waveguide to one of the plurality of sides of the substrate.

64. The optical modulator according to claim 63 further comprising a signal controlling circuit connected to the electrode to vary a direct-current bias applied to said electrode according to a change in the radiation light or signal leakage light guided by the light guiding unit.

65. The optical modulator according to claim 63, wherein said light guiding unit has a refractive index different from a refractive index of said substrate.

66. The optical modulator according to claim 63, wherein said light guiding unit guides radiation light from said optical waveguide.

67. The optical modulator according to claim 63, wherein said light guiding unit guides radiation light and the signal leakage light from said optical waveguide.

68. The optical modulator according to claim 63, wherein
the optical waveguide has an output waveguide,
the combining portion couples the subwaveguides to the output waveguide, and
said light guiding unit is provided in the vicinity of the output waveguide.

69. The optical modulator according to claim 63, wherein said light guiding unit is formed of titanium diffused into the substrate.

70. The optical modulator according to claim 68, wherein said output waveguide is substantially linear.

71. The optical modulator according to claim 68, wherein said output waveguide has a curved portion.

72. The optical modulator according to claim 64, further comprising a photo-detector positioned in the vicinity of the one of the plurality of sides of the substrate to receive the radiation light or signal leakage light guided by the light guiding unit, the photo-detector being connected to the signal controlling circuit.

73. The optical modulator according to claim 72, wherein said photo-detector is formed of a photo-detecting element on a plate member.

74. The optical modulator according to claim 73, wherein said plate member is a ceramic substrate.

75. The optical modulator according to claim 73, wherein said photo-detector element is a bear chip.

76. The optical modulator according to claim 63, wherein said substrate is a lithium niobate substrate.

77. The optical modulator according to claim 63, wherein the optical waveguide is a Mach-Zehnder optical waveguide.

78. The optical modulator according to claim 63, wherein the electrode causes light travelling in one of the subwaveguides to have a different phase than light travelling in the other of the subwaveguides such that destructive interference occurs at the combining portion to produce radiation light.

79. The optical modulator according to claim 63, wherein the light guiding unit has a larger refractive index than the refractive index of the substrate.

80. The optical modulator according to claim 72, wherein
the optical waveguide has an output waveguide,
the combining portion couples the subwaveguides to the output waveguide,
the optical modulator further comprises an output optical fiber and a lens positioned between the output waveguide and the output optical fiber, and
the photo-detector is positioned between the substrate and the lens.

81. The optical modulator according to claim 72, herein
the optical waveguide has an output waveguide,
the combining portion couples the subwaveguides to the output waveguide with the output waveguide running toward a rear of the substrate,
the optical modulator further comprises an output optical fiber, and
both the output optical fiber and the photo-detector are positioned at the rear of the substrate.

82. The optical modulator according to claim 72, wherein
the optical waveguide has an output waveguide,
the combining portion couples the subwaveguides to the output waveguide,
the output waveguide has a depth in the substrate from a surface of the substrate, and
the photo-detector is positioned further from the surface of the substrate in the depth direction than the output waveguide.

83. The optical waveguide according to claim 82, wherein the photo-detector is positioned from 600 $\mu$m to 800 $\mu$m further from the surface of the substrate in the depth direction than the output waveguide.

84. The optical modulator according to claim 68, wherein the light guiding unit is provided on one side of the output waveguide.

85. The optical modulator according to claim 68, wherein the light guiding unit is provided on both sides of the output waveguide.

86. The optical modulator according to claim 68, wherein the light guiding unit is separated from the output waveguide by a distance of from 7 $\mu$m to 10 $\mu$m.

87. The optical modulator according to claim 68, wherein
the output waveguide extends between sides of the substrate which run substantially parallel to the output waveguide, and
the light guiding unit is provided on both sides of the output waveguide to extend to the sides of the substrates.

88. The optical modulator according to claim 68, wherein
the output waveguide extends between sides of the substrate which run substantially parallel to the output waveguide, and
the light guiding unit is provided on both sides of the output waveguide and is positioned inward on the substrate from the sides of the substrate.

89. The optical modulator according to claim 68, wherein the light guiding unit is provided on both sides of the output waveguide and has a width which decreases away from the combining portion.

90. The optical modulator according to claim 87, wherein
the subwaveguides have angled portions which angle inward towards each other to meet at the combining portion, and
the light guiding unit is further provided between the angled portions and the sides of the substrate.

91. The optical modulator according to claim 88, wherein
the subwaveguides have angled portions which angle inward towards each other to meet at the combining portion, and
the light guiding unit is further provided between the angled portions and the sides of the substrate.

92. The optical modulator according to claim 89, wherein the output waveguide extends between sides of the substrate which run substantially parallel to the output waveguide, the subwaveguides have angled portions which angle inward towards each other to meet at the combining portion, and the light guiding unit is further provided between the angled portions and the sides of the substrate.

93. An optical modulator comprising:

a substrate having a top, a bottom and a plurality of sides connecting the top and the bottom;

an optical waveguide formed on the top of said substrate, the optical waveguide having two subwaveguides and a combining portion where the subwaveguides meet, the optical waveguide emitting radiation light and signal leakage light;

an electrode formed on the top of the substrate to control light propagated in said optical waveguide; and an interference light generating device, separate from the optical waveguide, to receive the radiation light and signal leakage light from the optical waveguide, to cause the radiation light to interfere with the signal leakage light to thereby generate interference light and to guide the interference light to one of the plurality of sides of the substrate.

94. The optical modulator according to claim 93, wherein said interference light has an inverted phase from that of said signal light.

95. The optical modulator according to claim 93, wherein said light guiding unit has a refractive index different from a refractive index of said substrate.

96. The optical modulator according to claim 93, wherein said light guiding unit is formed of titanium diffused into the substrate.

97. The optical modulator according to claim 93, wherein said output waveguide is substantially linear.

98. The optical modulator according to claim 93, wherein said output waveguide has a curved portion.

99. The optical modulator according to claim 93, wherein said substrate is a lithium niobate substrate.

100. The optical modulator according to claim 93, wherein the optical waveguide is a Mach-Zehnder optical waveguide.

101. The optical modulator according to claim 93, wherein the electrode causes light travelling in one of the subwaveguides to have a different phase than light travelling in the other of the subwaveguides such that destructive interference occurs at the combining portion to produce radiation light.

102. The optical modulator according to claim 93, wherein the light guiding unit has a larger refractive index than the refractive index of the substrate.

103. The optical modulator according to claim 93, further comprising a signal controlling circuit connected to the electrode to vary a direct-current bias applied to said electrode according to a change in the interference light guided by the light guiding unit.

104. The optical modulator according to claim 103, further comprising a photo-detector positioned in the vicinity of the one of the plurality of sides of the substrate to receive the interference light guided by the light guiding unit, the photo-detector being connected to the signal controlling circuit.

105. The optical modulator according to claim 104, wherein the optical waveguide has an output waveguide, the combining portion couples the subwaveguides to the output waveguide, the optical modulator further comprises an output optical fiber and a lens positioned between the output waveguide and the output optical fiber, and the photo-detector is positioned between the substrate and the lens.

106. The optical modulator according to claim 104, wherein the optical waveguide has an output waveguide, the combining portion couples the subwaveguides to the output waveguide with the output waveguide running toward a rear of the substrate, the optical modulator further comprises an output optical fiber, and both the output optical fiber and the photo-detector are positioned at the rear of the substrate.

107. The optical modulator according to claim 104, wherein the optical waveguide has an output waveguide, the combining portion couples the subwaveguides to the output waveguide, the output waveguide has a depth in the substrate from a surface of the substrate, and the photo-detector is positioned further from the surface of the substrate in the depth direction than the output waveguide.

108. The optical waveguide according to claim 107, wherein the photo-detector is positioned from 600 $\mu$m to 800 $\mu$m further from the surface of the substrate in the depth direction than the output waveguide.

109. The optical modulator according to claim 104, wherein said photo-detector is formed of a photo-detecting element on a plate member.

110. The optical modulator according to claim 109, wherein said plate member is a ceramic substrate.

111. The optical modulator according to claim 109, wherein said photo-detecting element is a bear chip.

112. The optical modulator according to claim 93, wherein the optical waveguide has an output waveguide, the combining portion couples the subwaveguides to the output waveguide, and said light guiding unit is provided in the vicinity of the output waveguide.

113. The optical modulator according to claim 93, wherein the light guiding unit is provided on one side of the output waveguide.

114. The optical modulator according to claim 93, wherein the light guiding unit is provided on both sides of the output waveguide.

115. The optical modulator according to claim 93, wherein the light guiding unit is separated from the output waveguide by a distance of from 7 $\mu$m to 10 $\mu$m.

116. The optical modulator according to claim 93, wherein the output waveguide extends between sides of the substrate which run substantially parallel to the output waveguide, and the light guiding unit is provided on both sides of the output waveguide to extend to the sides of the substrates.

117. The optical modulator according to claim 112, wherein
the output waveguide extends between sides of the substrate which run substantially parallel to the output waveguide, and
the light guiding unit is provided on both sides of the output waveguide and is positioned inward on the substrate from the sides of the substrate.

118. The optical modulator according to claim 112, wherein the light guiding unit is provided on both sides of the output waveguide and has a width which decreases away from the combining portion.

119. The optical modulator according to claim 116, wherein
the subwaveguides have angled portions which angle inward towards each other to meet at the combining portion, and
the light guiding unit is further provided between the angled portions and the sides of the substrate.

120. The optical modulator according to claim 117, wherein
the subwaveguides have angled portions which angle inward towards each other to meet at the combining portion, and
the light guiding unit is further provided between the angled portions and the sides of the substrate.

121. The optical modulator according to claim 112, wherein
the output waveguide extends between sides of the substrate which run substantially parallel to the output waveguide,
the subwaveguides have angled portions which angle inward towards each other to meet at the combining portion, and
the light guiding unit is further provided between the angled portions and the sides of the substrate.

122. A method of forming an optical modulator, comprising the steps of:
(a) forming an optical waveguide on a top of a substrate having a top, a bottom and a plurality of sides connecting the top and the bottom, the optical waveguide having two subwaveguides and a recombining portion where the subwaveguides meet, the optical waveguide emitting radiation light or signal leakage light;
(b) forming an electrode on the top of the substrate to control light travelling in the optical waveguide; and
(c) forming a light guiding unit on the substrate, separate from the optical waveguide, for guiding radiation light or signal leakage light from the optical waveguide to one of the plurality of sides of the substrate.

123. The method according to claim 122, wherein the light guiding unit is formed by diffusing titanium into the substrate.

124. The method according to claim 122 wherein the light guiding unit is formed by conducting an ion exchange process with the substrate.

* * * * *